United States Patent [19]

Nishizawa et al.

[11] Patent Number: 4,719,551

[45] Date of Patent: Jan. 12, 1988

[54] OPTICALLY CONTROLLED POWER CONVERTING APPARATUS

[75] Inventors: Junichi Nishizawa; Takashige Tamamushi, both of Sendai; Kimio Miura, Izumi; Kiyoo Mitsui; Koichi Mitamura, both of Sendai, all of Japan

[73] Assignees: Zaidan Hojin Handotai Kenkyu Sinkokai; Tohoku Electric Power Company, Incorporated, both of Sendai, Japan

[21] Appl. No.: 879,941

[22] Filed: Jun. 30, 1986

[30] Foreign Application Priority Data

Jun. 29, 1985 [JP] Japan .................... 60-143278

[51] Int. Cl.⁴ .......................................... H02M 7/527
[52] U.S. Cl. .......................................... 363/41; 307/637; 357/22; 357/30; 363/37; 363/128; 363/129; 363/136; 363/137; 323/207
[58] Field of Search ............... 363/41, 136, 137, 37, 363/128, 129; 307/252 G, 252 A, 311, 631, 637; 357/30 G, 30 O, 22 B, 22 D, 22 C; 323/207

[56] References Cited

U.S. PATENT DOCUMENTS

| | | |
|---|---|---|
| 4,200,879 | 4/1980 | Nonaka et al. .................... 357/22 C |
| 4,486,824 | 12/1984 | Okuyama et al. .................... 363/137 |

FOREIGN PATENT DOCUMENTS

| | | | |
|---|---|---|---|
| 37461 | 3/1979 | Japan | 307/252 A |
| 54668 | 3/1986 | Japan . | |
| 603089 | 4/1978 | U.S.S.R. | 363/137 |

OTHER PUBLICATIONS

Zurgum et al, "A New Gate Turn-Off Switch (G.T.O.) Used in a P.W.M. A.C. Motor Drive," Cout: Proc. of the First Annual Int. Motorcon '81 Conference, Chicago, IL., U.S.A. (10–13 Jun. 1981), pp. 483–491.
Fourth International Conference on AC and DC Power Transmission, Conference Publication Number 255, "New Thyristor Applicable to DC Power Transmission," by Nishizawa and Tamamushi, pp. 304–309 (undated).

*Primary Examiner*—William H. Beha, Jr.
*Attorney, Agent, or Firm*—Oblon, Fisher, Spivak, McClelland & Maier

[57] ABSTRACT

The present invention provides an optically controlled power converting apparatus using light trigger/light quench electrostatic induction thyristors, as switching elements, which can execute the switching operations at a high speed being when they are supplied with light trigger pulses and light quench pulses. By supplying the light trigger pulses and light quench pulses at the timings corresponding to the pulse width modulation, the light trigger/light quench electrostatic induction thyristors can perform predetermined power converting operations.

14 Claims, 56 Drawing Figures

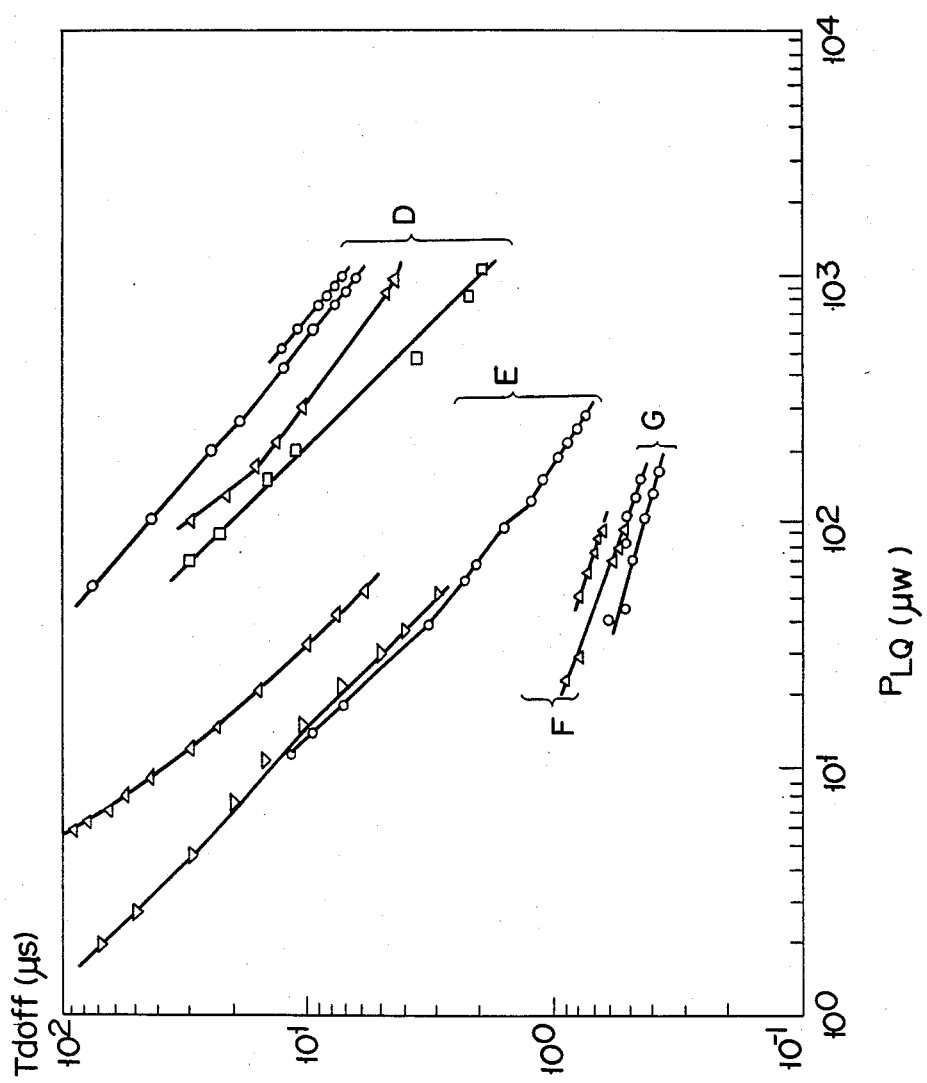

OPTICALLY CONTROLLED POWER CONVERTING APPARATUS

BACKGROUND OF THE INVENTION

The present invention relates to a power converting apparatus of, for example, inverters for DC-AC conversion and converters for AC-DC conversion of a single phase and multiphases, inverters for AC-DC-AC conversion to drive a multiphase AC motor, active filters, and the like and, more particularly, to a power converting apparatus in which a light triggered and light quenched electrostatic induction thyristor is used as a switching element, and a light trigger pulse and a light quench pulse are supplied to the thyristor at a timing corresponding to the pulse width modulation, whereby a predetermined power converting operation is performed.

As is well known, for example, in the power converting apparatus of the DC-AC converting inverter, AC-DC converter, or the like, a reverse-blocking three-terminal thyristor (SCR), a light triggered thyristor, or the like is used as a switching element. A three-phase AC bridge circuit is widely used as a general circuit constitution. Such a thyristor is the commutation turn-off type element. By performing the turn-on and commutation turn-off at a frequency of, e.g., about 50 to 60 Hz by use of the commutation cycle, this thyristor can execute the DC-AC conversion and AC-DC conversion.

On the other hand, for example, in the power converting apparatus which handles a large electric power, such as applied to the DC power transmission, a plurality of light triggered thyristors are connected in series-parallel, thereby allowing the switching operations of the light-triggered turn-on and commutation turn-off to be executed at a frequency of 50 to 60 Hz.

However, the power converting apparatus using the three-phase AC bridge circuit using such a commutation turn-off type thyristor has the following problems. The AC frequency which can be handled is as low as 50 to 60 Hz. It takes a long time, e.g., hundreds of $\mu$sec, to perform the commutation turn-off of the light triggered thyristor. Therefore, this apparatus is unfitted for the high speed operation.

Therefore, a power semiconductor device of the self-turn-off type also has conventionally been used as a switching device for use in the above-mentioned power converting apparatus. As the self-turn-off type power semiconductor device, for example, various kinds of transistors of power bipolar transistor, power MOS (Metal Oxide Semiconductor) field effect transistor (FET), power electrostatic induction transistor (SIT), and the like, and a gate turn-off thyristor (GTO) are used.

The self-turn-off type semiconductor devices such as the above transistors, gate turn-off thyristor, and the like can perform the switching operations as their gates are electrically controlling the gate (or base). Also, the time required for turn-off is so short to be a few to tens of $\mu$sec. Therefore, by constituting a single-phase or multiphase inverter or converter in a manner such that the self-turn-off type semiconductor device executes the switching operations by use of, e.g., a control system due to a pulse width modulation, such a device can advantageously realize the high-speed operation.

In the power converting apparatus using such a self-turn-off type semiconductor device, however, a control circuit must be provided to control the semiconductor device since the gate (or base) needs to be electrically controlled. The apparatus is inevitably complicated. In the gate turn-off thyristor, control circuits are necessary for both of the turn-on and turn-off, respectively. This will also likely complicate the constitution. Moreover, in the case of handling a large electric power, a plurality of semiconductor elements are connected in series-parallel, and more circuit elements are required to further complicate the structure. Moreover, since it is difficult to electrically isolate the portion which handles a large electric power from the control circuit portion, the magnitude of the electric power which can be handled is also limited.

SUMMARY OF THE INVENTION

The present invention is made in consideration of the foregoing circumstances and it is an object of the invention to provide an optically controlled power converting apparatus in which a constitution is simple, the high speed operation can be performed, a large electric power can be also handled due to the light triggering/light quenching operations by way of the light, and a fairly good performance is derived.

According to one aspect of the present invention, there is provided an optically controlled power converting apparatus in which light triggered and light quenched electrostatic induction thyristors are used as switching elements, and light trigger pulses and light quench pulses are irradiated to the light triggered and light quenched electrostatic induction thyristors at the timings corresponding to a pulse width modulation, thereby allowing predetermined power converting operations to be performed.

BRIEF DESCRIPTION OF THE DRAWINGS

FIG. 2B shows the light quenching characteristic of the thyristors shown in FIGS. 1A;

DETAILED DESCRIPTION OF THE PREFERRED EMBODIMENTS

Prior to describing an embodiment of the present invention, a light triggered and light quenched electrostatic induction thyristor (hereinafter, referred to as an LTQ SI thyristor) which is used in this invention will be described hereinbelow. Namely, this LTQ SI thyristor can be turned on and turned off by a light and is constituted by connecting a photosensitive element to a gate region of the electrostatic induction thyristor which can be directly triggered by the light or can be indirectly triggered by the light. As such a photosensitive element, it is desirable to use the element having a high light amplification factor and a high response speed adapted to be externally connected to or integrally connected to the gate of the electrostatic induction thyristor. For example, an electrostatic induction phototransistor or the like is used.

Figure 1A:
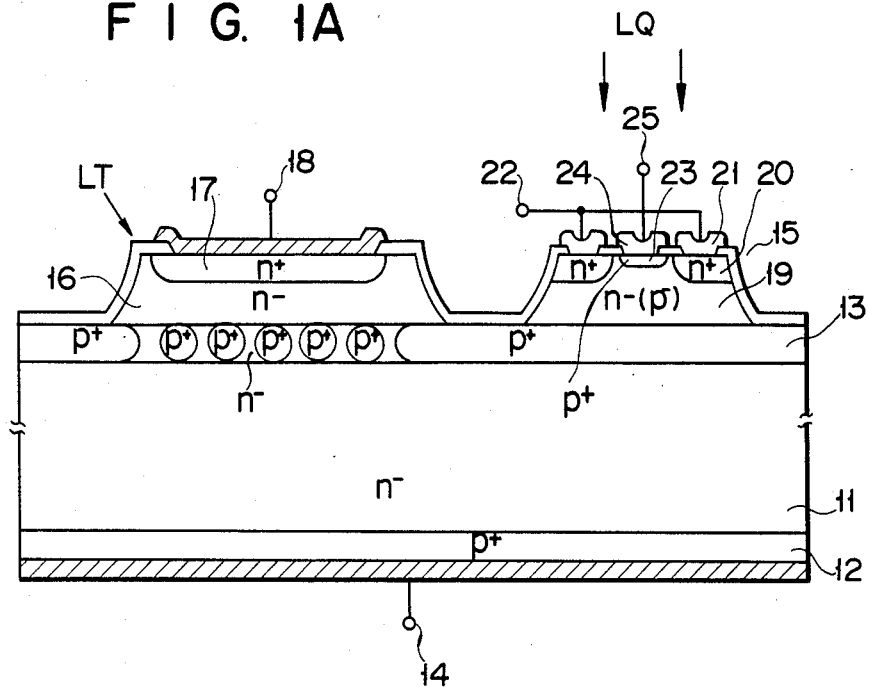
FIG. 1A is an example of a side cross-sectional view of a single gate, light triggered and light quenched electrostatic induction thyristor.

FIG. 1A shows an example of the integrated structure of an LTQ SI thyristor having a single gate structure. Namely, a p+ anode region 12 and a p+ gate region 13 are formed on the lower and upper surfaces of an n− type high resistivity semiconductor region 11 in the diagram, respectively. An anode terminal 14 of the LTQ SI thyristor is connected to the p+ anode region 12. The p+ gate region 13 serves as a first gate region of the LTQ SI thyristor and also serves as a source region of an electrostatic induction phototransistor (hereinafter, referred to as an SIPT) 15.

An n− type high resistivity epitaxial region 16 is formed on the p+ gate region 13. An n+ cathode region 17 is formed in the n− high resistance epitaxial region 16. A cathode terminal 18 of the LTQ SI thyristor is connected to the n+ cathode region 17.

A channel region 19 of the SIPT 15 is formed on the p+ gate region 13. Channel region 19 is formed simultaneously with epitaxial region 16. In the case where channel region 19 is formed as an n− layer, SIPT 15 is constituted as a punching through type bipolar phototransistor. In the case where channel region 19 is formed as a p− layer, SIPT 15 is constituted as a p− channel SIPT. In any of these cases, SIPT 15 is constituted as a transistor having substantially the equivalent function.

An n+ gate (base) region 20 is formed in channel region 19. The n+ gate (base) region 20 is connected to a gate (base) terminal 22 through a gate (base) electrode 21. A p+ drain (collector) region 23 is formed in the channel region 19 and connected to a drain (collector) terminal 25 through a drain (collector) electrode 24.

The LTQ SI thyristor of the single gate structure constituted as mentioned above is the LTQ SI thyristor of the type which is directly triggered by the light. When a light triggering pulse LT is now irradiated in the direction indicated by an arrow in the diagram, electron-hole pairs are generated in the n− type high resistivity semiconductor region 11. The photogenerated holes are accumulated in p+ gate region 13 and cause an increase in gate potential of p+ gate region 13. On the other hand, the photogenerated electrons are accumulated in the junction portion of the p+ anode region 12 and the n− type semiconductor region 11 and cause the holes to be injected from the p+ anode region 12 into n− semiconductor region 11. The holes injected into the semiconductor region 11 are accumulated into p+ gate region 13.

Therefore, the potential of p+ gate region 13 gradually increases and when it exceeds a predetermined threshold level, the LTQ SI thyristor is turned on.

When the LTQ SI thyristor is in the turn-on state as mentioned above, the hole current from the p+ anode region 12 continuously flows through the n− type semiconductor region 11, the p+ gate region 13, and the n− type epitaxial region 16 to the n+ cathode region 17. The electron current from the n+ cathode region 17, on the other hand, continuously flows through the n− type epitaxial region 16, the p+ gate region 13, and the n− type semiconductor region 11 to the p+ anode region 12. At this time, SIPT 15 is in the off state.

When a light quenching pulse LQ is irradiated to the SIPT 15 in the direction indicated by arrows in the diagram in the turn-on state of such an LTQ SI thyristor, electron-hole pairs are generated in n− or p− channel region 19. The photogenerated electrons are accumulated into n+ gate (base) region 20 and cause the potential of n+ gate (base) region 20 to be changed. Then, in response to this potential change of n+ gate (base) region 20, a conductive channel is formed between the p+ source (emitter) region 13 of the SIPT and the p+ drain (collector) region 23 of the SIPT. Thus, the holes which have already been accumulated in the p+ source (emitter) region 13 of the SIPT in the turn-on state flow into the p+ drain (collector) region 23 of the SIPT through the conductive channel.

Therefore, by applying a negative voltage to drain (collector) terminal 25, the holes accumulated in p+ gate region 13 and the holes which are injected from p+ anode region 12 can be taken out through drain (collector) terminal 25 at a very high speed. At the same time, the potential of p+ gate region 13 also increases to a level necessary to turn off the LTQ SI thyristor and causes the injection of the electrons from the n+ cathode region 17 to be blocked. In this way, the LTQ SI thyristor is turned off.

Although the voltage which is applied to drain (collector) terminal 25 may be at a zero level, a negative voltage is desirable to turn off the LTQ SI thyristor at a high speed as mentioned above.

Figure 1B:
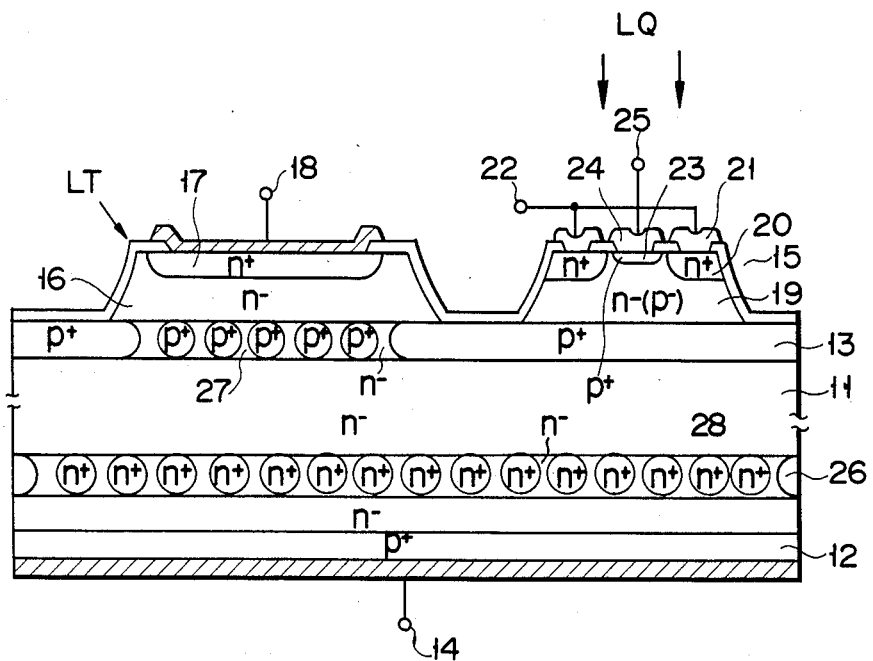
FIG. 1B is an example of a side cross-sectional view of a double gate, light triggered and light quenched electrostatic induction thyristor.

FIG. 1B shows an example of the integrated structure of an LTQ SI thyristor of a double-gate structure, in which the same portions as those in the single-gate structure are designated by the same reference numerals. The double-gate structure in FIG. 1B differs from the single-gate structure in FIG. 1A with respect to the point that an n+ gate region 26 is embedded in the n− type high resistivity semiconductor region 11 in front of p+ anode region 12.

With this structure in FIG. 1B, when the light triggering pulse LT is supplied, the electrons photo-generated in the n− type semiconductor region 11 are accumulated into the n+ gate region 26. Therefore, the injection efficiency of holes from the p+ anode region 12 to the p+ gate region 13 is much higher than that in the single-gate structure.

In the LTQ SI thyristors having the single-gate and double-gate structures, the punching through type bipolar base structure which performs the operation substantially similar to that of the electrostatic induction transistor (hereinafter, referred to as the SIT) gate structure which is formed by the p+ gate region 13 and the n− channel region 27 or of the SIT gate structure which is formed by the n+ gate region 26 and n− base region 28 has the feature such that its light amplification factor increases as the light intensity decreases. The light trigger sensitivity of this structure is better than that of the bipolar base structure in the conventional light triggered thyristor by about two orders. Namely, the light trigger sensitivity of the LTQ SI thyristor is higher than the conventional light trigger thyristor, so that the time required to turn on the thyristor can be reduced and it can be turned on at a high speed.

In the case of the single-gate structure, since the electrons which are accumulated near p+ anode region 12 are recombined with the holes in p+ anode region 12 and extinguished, a tailing current is generated when the thyristor is turned off. In the case of the double-gate structure, however, since the electrons are accumulated into n+ gate region 26, for example, a terminal (not shown) is connected to the n+ gate region 26, an n channel SIPT (not shown) having the structure similar to SIPT 15 integrally connected to p+ gate region 13 is connected to this terminal and anode terminal 14, and light quenching pulse LQ is simultaneously irradiated, thereby making it possible to also take out the electrons accumulated in n+ gate region 26 and to turn off the thyristor at a high speed. In this case, the tailing current component generated in the single-gate structure is not appeared.

Although the structure and operation of the LTQ SI thyristor have been described above, the gate structure of the thyristor portion is not limited to the embedded gate structure but may be obviously the recessed gate structure or planar gate structure. As the photosensitive element for light quenching, it is sufficient to use an element which can respond to the light. To improve the light amplification factor, it is also possible to take a measure to use an amplifying gate structure or the like.

The single-gate type SI thyristor of the class of 2500 V and 300 A was operated at a duty cycle of 50% and the switching losses were obtained by the experiments. The sum of the switching losses when the SIT was turned on and off was 0.2 to 0.3 J/pulse. In this case, the voltage drop in the forward direction was 1.72 V at 300 A. Therefore, a conversion efficiency η from the direct current to the alternating current of the single-gate type SI thyristor becomes $$\eta \simeq 1 - \frac{1.72V \times 300A \times 50\% + 0.3J \times f}{1250V \times 300A}$$

due to a linear approximation, in which f is a switching operating frequency.

When f is 60 Hz, η is above 99.9%. When f is 11 kHz, η is 99%. Therefore, it will be understood that the value of η is very high.

Therefore, the single-gate type SI thyristor of the class of 2500 V and 300 A has a power conversion efficiency η above 99% until operating frequency f of about 10 kHz. Therefore, by use of the double-gate type structure, the switching losses further decrease to a value of 0.02 to 0.03 J/pulse. At this time, power conversion efficiency η of 99% can be held until operating frequency f of about 100 kHz.

In place of electrically performing the switching operation of the SI thyristor which operates at a high frequency as mentioned above, the LTQ SI thyristor performs the switching operation due to the light by use of light triggering pulse LT and light quenching pulse LQ. Therefore, the time required for turn-on and turn-off is short and the high speed operation can be performed. A high power conversion efficiency can be held until a high frequency range.

Figure 2A:
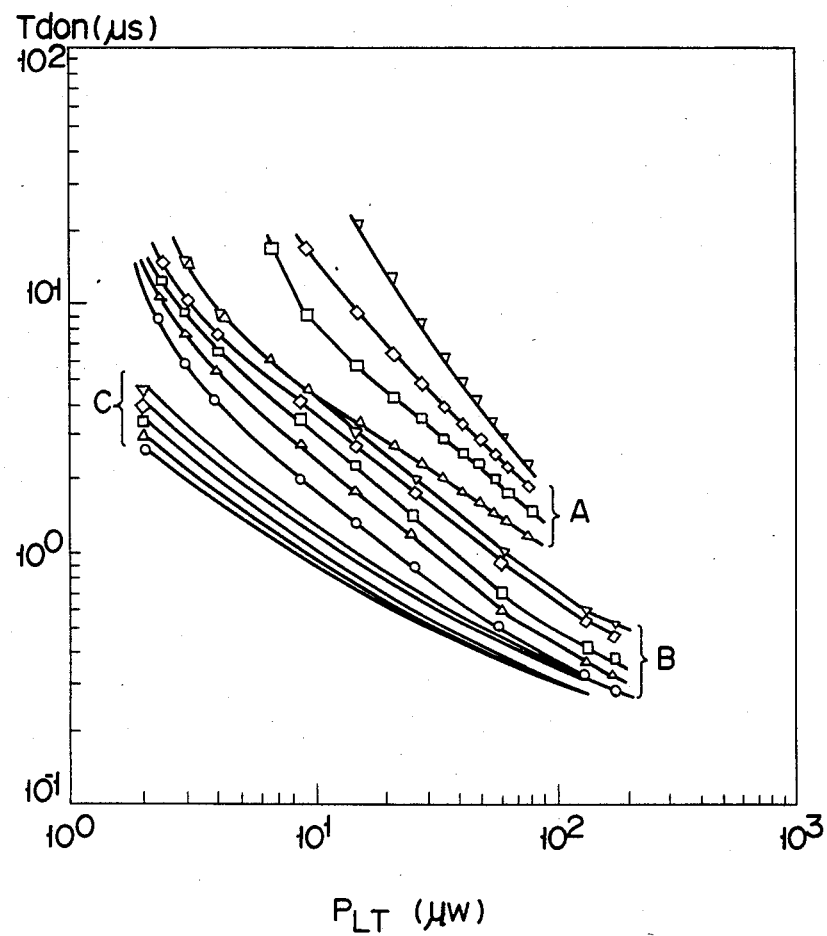
FIG. 2A shows the light triggering characteristics of the thyristors shown in FIGS. 1A.

FIGS. 2A and 2B show the light triggering characteristic and light quenching characteristic of the LTQ SI thyristors, respectively. First, FIG. 2A shows the relation between a turn-on delay time $T_{don}$ and a light triggering power $P_{LT}$ when light triggering pulse LT was irradiated. This graph shows the results in the case where the anode current is 1 A and the applied voltage between the anode and the cathode was changed to 100 V (▽), 200 V (◇), 300 V (□), 400 V (Δ), and 500 V (O). A group A shows the case where the thyristor is directly triggered by the light. Groups B and C show the case where the thyristor is indirectly triggered by the light, by utilizing the amplifying gate.

FIG. 2B shows the relation between a turn-off delay time $T_{doff}$ and a light quenching power $P_{LQ}$ when light quenching pulse LQ was supplied. In this case, the anode current and applied voltage between the anode and the cathode are the same as those mentioned above. Groups D and E show the case of the direct light quench when the quenching SIPT was changed. Groups F and G show the case of the indirect light quench.

In any of these cases, it will be understood that both of the turn-on delay time Tdon and the turn-off delay time $T_{doff}$ are so short to be on the order of about 1 μsec in spite of the fact that the anode current is 1A and the anode-cathode applied voltage is hundreds of volts and also the light power is very small, e.g., 10 μW to hundreds of μW.

Figures 3, 5:
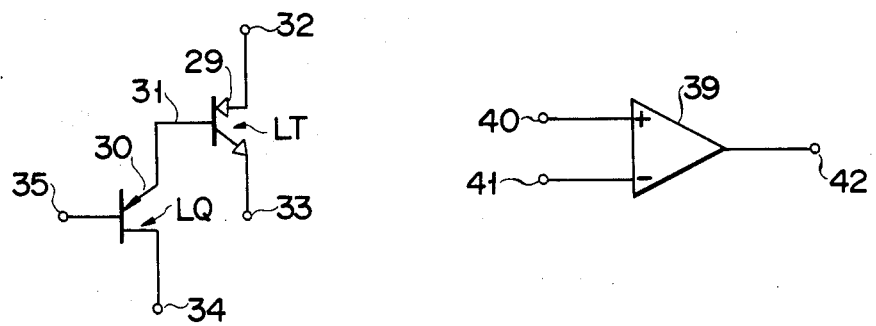
FIG. 3 is an equivalent circuit diagram of the thyristors shown in FIGS. 1A and 1B.
FIG. 5 is a circuit arrangement diagram showing a level comparator in a pulse width modulating section of the inverter.

FIG. 3 shows a form as a circuit diagram of the LTQ SI thyristor using the p channel SIPT as a photosensitive element for the light quenching operation. Namely, in the diagram, a light triggered SI thyristor 29 is directly triggered by light triggering pulse LT. In the diagram, a p channel SIPT 30 for the light quenching is made conductive by light quenching pulse LQ. By taking out the holes accumulated in a gate 31 of the SI thyristor 29 and the hole current from the anode, SIPT 30 functions so as to turn off the light triggered SI thyristor 29. In the diagram, reference numeral 32 denotes an anode terminal; 33 is a cathode terminal; 34 a drain terminal of SIPT 30; and 35 a gate terminal of the SIPT 30.

In this case, the potential common to that of cathode terminal 33 may be applied to drain terminal 34 of SIPT 30. However, by applying a negative bias voltage, the holes can be taken out faster and the thyristor can be turned off at a high speed. On the other hand, in place of directly triggering the SI thyristor 29 by the light, SIPTs for trigger are individually provided and the amplification gate triggering can be also carried out. Further, instead of directly irradiating the light to the SIPT 30, an SIPT for driving the SIPT 30 is individually provided and the amplification gate triggering may be indirectly executed.

A feature of the present invention will be summarized as follows. As mentioned above, the LTQ SI thyristor which performs the high speed switching operation due to the light control is used as a switching element. Light triggering pulse LT and light quenching pulse LQ are irradiated to the LTQ SI thyristor at the timing corresponding to the pulse width modulation, thereby allowing a predetermined power converting operation to be executed.

An embodiment of the invention using the LTQ SI thyristors as mentioned above will now be described in detail hereinbelow with reference to the drawings.

Figure 4:
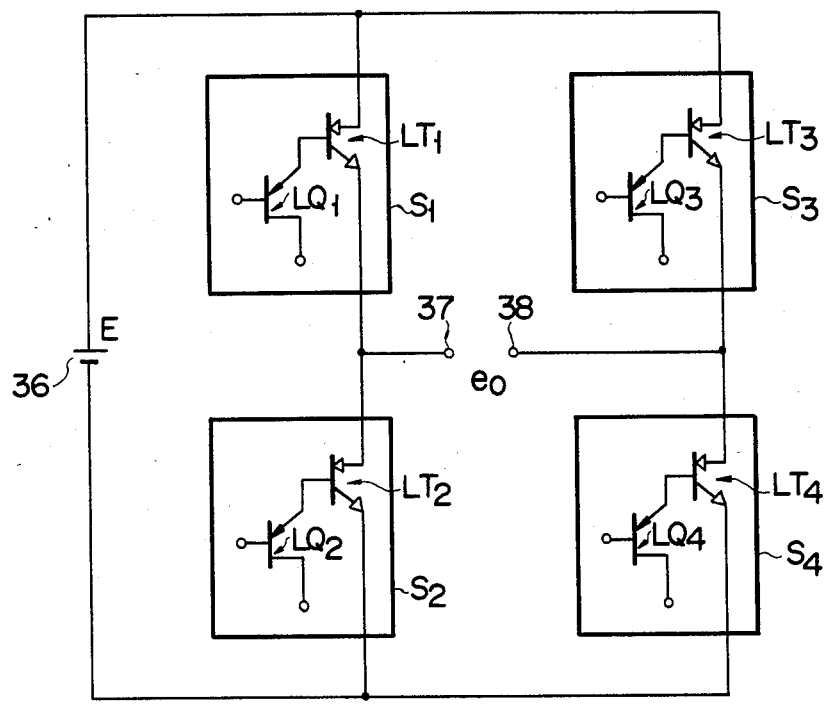
FIG. 4 shows an optically controlled power converting apparatus of the present invention, for use in combination with a light triggered and light quenched electrostatic induction thyristor and is a circuit arrangement diagram showing a single-phase inverter for DC-AC conversion.

First, FIG. 4 shows a single-phase inverter for a DC-AC conversion including the LTQ SI thyristors. Namely, in the diagram, $S_1$ to $S_4$ denote LTQ SI thyristors. By supplying light triggering pulses $LT_1$ to $LT_4$ and light quenching pulses $LQ_1$ to $LQ_4$ to LTQ SI thyristors $S_1$ to $S_4$, respectively, these thyristors perform switching operations. A DC voltage E which is sent from a DC power supply system is indicated as a constant voltage source 36. Further, an output AC voltage $e_0$ is taken out from between a terminal 37 connected to the connecting point of LTQ SI thyristors $S_1$ and $S_2$ and a terminal 38 connected to the connecting point of LTQ SI thyristors $S_3$ and $S_4$.

FIG. 5 shows a level comparator 39 of a pulse width modulating section to perform the switching controls of LTQ SI thyristors $S_3$ and $S_4$.

An absolute value signal of a sine wave having the same frequency as a frequency $f_0$ of output signal $e_0$ which is output from between terminals 37 and 38 is supplied to a non-inverting input terminal 40 of level comparator 39. On the other hand, a carrier triangular wave signal having frequency $f_c$ higher than that of the absolute value signal of the sine wave is supplied to an inverting input terminal 41 of level comparator 39.

Figure 6:
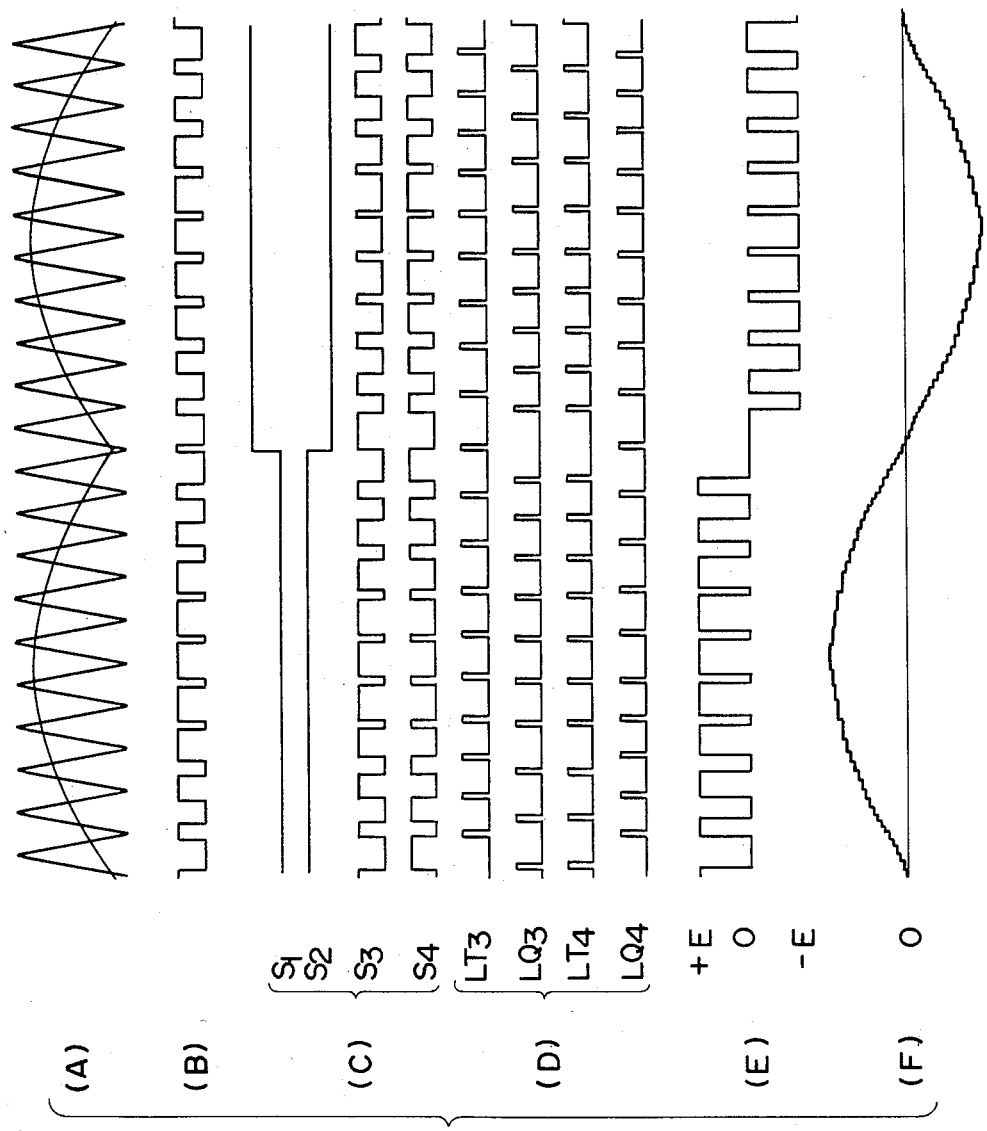
FIGS. 6A to 6F are timing charts for explaining the operation of the inverter, respectively.

Namely, when the absolute value signal of the sine wave and the carrier triangular wave signal as shown in FIG. 6 are supplied to non-inverting and inverting input terminals 40 and 41 of level comparator 39, a pulse width modulation signal as shown in FIG. 6B is output from an output terminal 42 of level comparator 39.

FIG. 6C shows timing charts for the switching operations of LTQ SI thyristors $S_1$ to $S_4$, in which a low level (L) shows the turn-off state and a high level (H) shows the turn-on state. Namely, LTQ SI thyristors $S_1$ and $S_2$ are oppositely switching-controlled at every half period of the sine wave signal. On the other hand, LTQ SI thyristor $S_3$ is switching-controlled in correspondence to an output signal of level comparator 39 (refer to FIG. 6B). LTQ SI thyristor $S_4$ is switching-controlled oppositely to LTQ SI thyristor $S_3$. Each timing waveform shown in FIG. 6C corresponds to the pulse width modulation.

FIG. 6D show the timings of supplying light triggering pulses $LT_3$ and $LT_4$ and light quenching pulses $LQ_3$ and $LQ_4$ which are irradiated to LTQ SI thyristors $S_3$ and $S_4$ in order to allow thyristors $S_3$ and $S_4$ to execute the switching-operations at the timings shown in FIG. 6C. Namely, light triggering pulse $LT_3$ which is supplied to LTQ SI thyristor $S_3$ is generated in response to the leading portion of the timing waveform shown at $S_3$ in FIG. 6C. Light quenching pulse $LQ_3$ is generated in response to the trailing portion of the timing waveform shown at $S_3$ in FIG. 6C. Thus, thyristor $S_3$ can be switching-controlled at the timing shown at $S_3$ in FIG. 6C.

Similarly, light triggering pulse $LT_4$ which is irradiated to LTQ SI thyristor $S_4$, on the other hand, is similarly generated in response to the leading portion of the timing waveform shown at $S_4$ in FIG. 6C. Light quenching pulse $LQ_4$ is generated in response to the trailing portion of the timing waveform shown at $S_4$ in FIG. 6C. Thus, thyristor $S_4$ can be switching-controlled at the timing shown at $S_4$ in FIG. 6C.

Further, although not shown in FIGS. 6A to 6F, light triggering pulses $LT_1$ and $LT_2$ and light quenching pulses $LQ_1$ and $LQ_2$ which are supplied to LTQ SI thyristors $S_1$ and $S_2$ are generated in response to the trailing portions of the timing waveforms shown at $S_1$ and $S_2$ in FIG. 6C. Thus, thyristors $S_1$ and $S_2$ can be switching-controlled at the timings shown at $S_1$ and $S_2$ in FIG. 6C.

Light triggering pulses $LT_1$ to $LT_4$ and light quenching pulses $LQ_1$ to $LQ_4$ which are generated at the above-mentioned timings are supplied to LTQ SI thyristors $S_1$ to $S_4$ through light transmitting media such as, for example, optical fiber cables or the like. In this case, for example, light emitting diodes, semiconductor lasers, lamps, or the like may be used as a light source. As intensities of the light beams irradiated as shown in FIGS. 2A and 2B as well, they may be set to a value of a few to hundreds of $\mu W$ for the light triggering and to a value of about tens of $\mu W$ to a few mW for the light quenching.

By respectively supplying light triggering pulses $LT_1$ to $LT_4$ and light quenching pulses $LQ_1$ to $LQ_4$ to LTQ SI thyristors $S_1$ to $S_4$ at the foregoing timings, output $e_0$ which was subjected to the pulse width modulation as shown in FIG. 6E is generated between terminals 37 and 38. The peak value of output $e_0$ is equal to the output voltage E of constant voltage source 36. For the mean value of this output, it is possible to obtain an AC electric power which doesn't include low-order harmonics as shown in FIG. 6F. Consequently, the DC-AC conversion is carried out.

In this case, as mentioned above, a frequency of an output AC signal is determined by frequency $f_0$ of the absolute value signal of the sine wave which is supplied to non-inverting input terminal 40 of level comparator 39. Frequency $f_0$ is not limited to the ordinary commercially available power source frequency (50 to 60 Hz) as in the conventional one but may be set to a high value near the switching operating frequencies (e.g., 10 to 100 kHz) of the foregoing LTQ SI thyristors. Even in such a frequency band as well, the high efficient power conversion can be performed.

Figure 7:
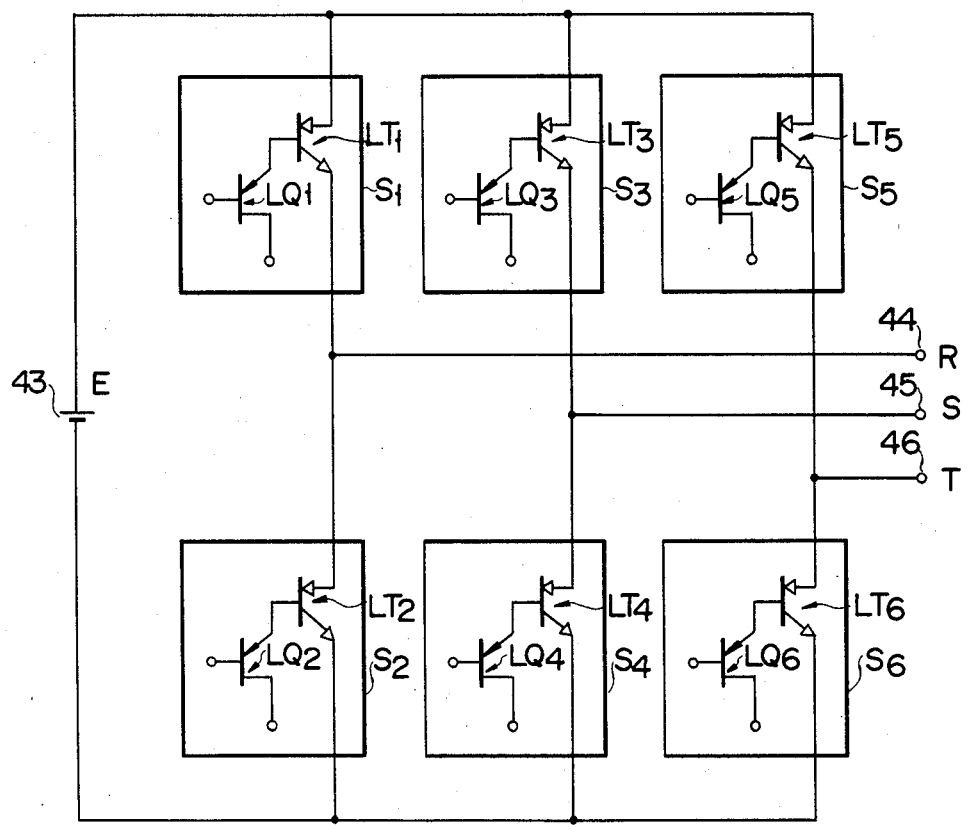
FIG. 7 is a circuit diagram of a three-phase inverter for DC-AC conversion used as the optically controlled power converting apparatus for a light triggered and light quenched electrostatic induction thyristor.

FIG. 7 shows a three-phase inverter for the DC-AC conversion including LTQ SI thyristors. In the diagram, $S_1$ to $S_6$ denote LTQ SI thyristors and perform the switching operations in response to with light triggering pulses $LT_1$ to $LT_6$ and light quenching pulses $LQ_1$ to $LQ_6$, respectively. DC voltage E which is sent from a DC power supply system (not shown) is represented by a constant voltage source 43. Further, the connecting point of thyristors $S_1$ and $S_2$ is connected to an output terminal 44 of an R-phase output signal. The connecting point of thyristors $S_3$ and $S_4$ is connected to an output terminal 45 of an S-phase output signal. The connecting point of thyristors $S_5$ and $S_6$ is connected to an output terminal 46 of a T-phase output signal.

Figure 8:
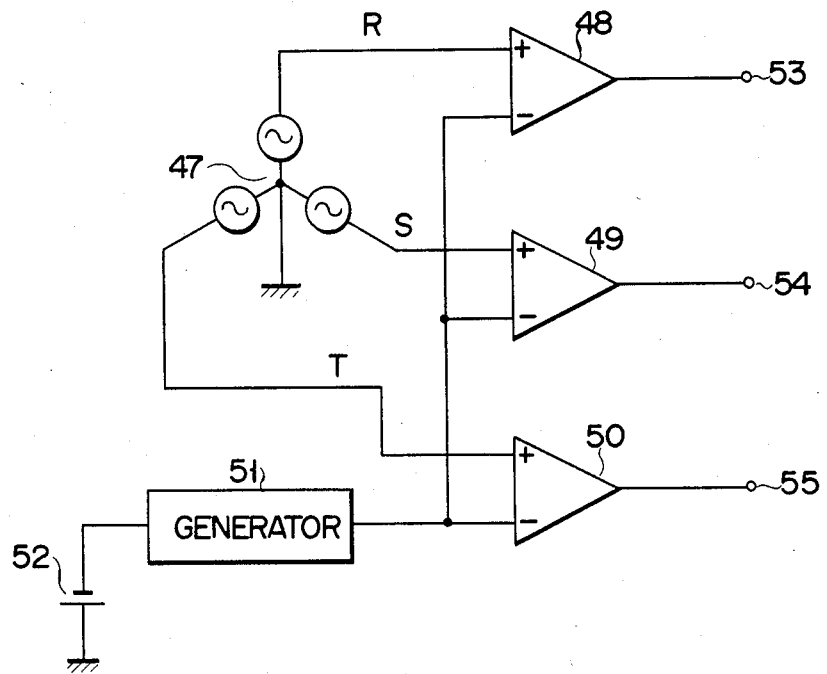
FIG. 8 is a block arrangement diagram showing a pulse width modulating section of the inverter.

FIG. 8 shows the pulse width modulating section to execute the switching controls of LTQ SI thyristors $S_1$ to $S_6$. Namely, in the diagram, a three-phase AC signal generating source 47 generates the R-phase, S-phase, and T-phase signals. The R-phase, S-phase, and T-phase signals which are generated from generating source 47 are supplied to respective non-inverting input terminals (+) of level comparators 48 to 50, respectively.

Carrier triangular wave signals which are generated from a carrier triangular wave signal generator 51 are supplied to respective inverting input terminals (−) of level comparators 48 to 50, respectively. The offsets of the carrier triangular wave signals which are generated from generator 51 are adjusted by an output voltage of a constant voltage source 52.

Figure 9:
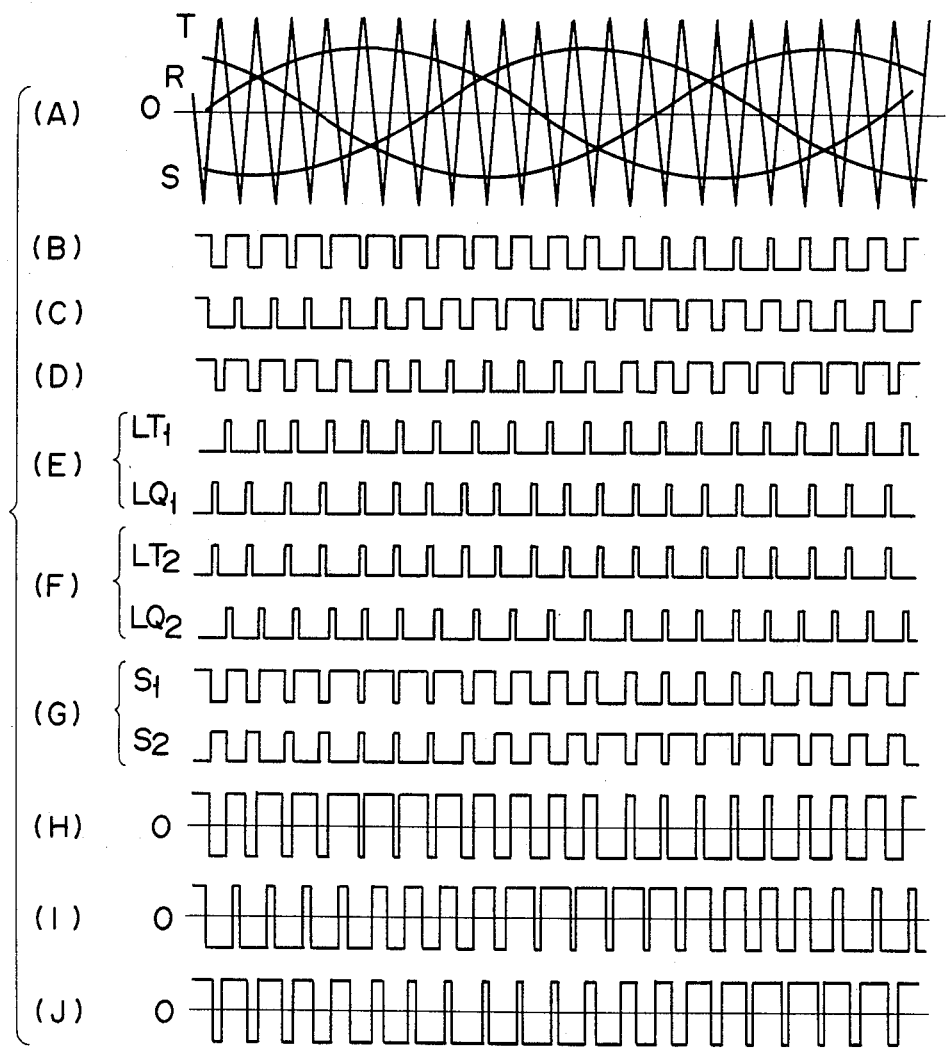
FIGS. 9A to 9J are timing charts for explaining the operation of the inverter, respectively.

When it is now assumed that the R-phase, S-phase, and T-phase signals, and the carrier triangular wave signals as shown in FIG. 9A were generated from three-phase AC signal generating source 47 and carrier triangular wave signal generator 51, R-phase, S-phase, and T-phase pulse signals as shown in FIGS. 9B, 9C, and 9D are output from output terminals 53 to 55 of level comparators 48 to 50, respectively.

The R-phase pulse signal shown in FIG. 9B decides the timings to allow thyristors $S_1$ and $S_2$ to perform the switching operations. The S-phase pulse signal shown in FIG. 9C determines the timings to allow thyristors $S_3$ and $S_4$ to execute the switching operations. The T-phase pulse signal shown in FIG. 9D decides the timings to allow thyristors $S_5$ and $S_6$ to carry out the switching operations. The respective pulse signals of the R, S, and T phases are the pulse width modulated signals.

Namely, an explanation will now be made with respect to only the R phase. Light triggering pulse $LT_1$ and light quenching pulse $LQ_1$ to be supplied to thyristor $S_1$ are generated at the leading edge and trailing edge of the R-phase pulse signal as shown in FIG. 9E, respectively. Light triggering pulse $LT_2$ and light quenching pulse $LQ_2$ to be supplied to thyristor $S_2$ are generated at the trailing edge and leading edge of the R-phase pulse signal as shown in FIG. 9F, respectively.

Therefore, the switching operations of thyristors $S_1$ and $S_2$ are performed at the timings as shown in FIG. 9G so as to become opposite to each other. In FIG. 9G, a low level (L) shows the turn-off state and a high level (H) shows the turn-on state.

Although not shown in FIGS. 9A to 9J, on the other hand, light triggering pulses $LT_3$ and $LT_4$ and light quenching pulses $LQ_3$ and $LQ_4$ to be supplied to LTQ SI thyristors $S_3$ and $S_4$ corresponding to the other S phase are generated on the basis of the S-phase pulse signal in a manner similar to the above; and light triggering pulses $LT_5$ and $LT_6$ and light quenching pulses $LQ_5$ and $LQ_6$ to be supplied to LTQ SI thyristors $S_5$ and $S_6$ corresponding to the other T phase are also likewise generated on the basis of the T-phase pulse signal. Namely, light triggering pulse $LT_3$ light quenching pulse $LQ_3$, which will be supplied to thyristor $S_3$, are generated at the leading and trailing edges of the S-phase pulse signal, respectively. Light triggering pulse $LT_4$ and light quenching pulse $LQ_4$ to be supplied to thyristor $S_4$ are generated at the trailing and leading edges of the S-phase pulse signal, respectively. Similarly, light triggering pulse $LT_5$ and light quenching pulse $LQ_5$, which will be supplied to thyristor $S_5$ are generated at the leading and trailing edges of the T-phase pulse signal, respectively. Light triggering pulse $LT_6$ and light quenching pulse $LQ_6$ to be supplied to thyristor $S_6$ are generated at the trailing and leading edges of the T-phase pulse signal, respectively.

By respectively irradiating light triggering pulses $LT_1$ to $LT_6$ and light quenching pulses $LQ_1$ to $LQ_6$ to thyristors $S_1$ to $S_6$ at the timings mentioned above, the pulse width modulated R-phase, S-phase, and T-phase outputs as shown in FIGS. 9H, 9I, and 9J are generated from output terminals 44 to 46, respectively. The respective mean values of the R-phase, S-phase, and T-phase outputs become the three-phase electric power including no low-order harmonics. In this way, the three-phase DC-AC conversion is carried out.

In this case, the frequency of the three-phase AC electric power is determined by the frequencies of the R-phase, S-phase, and T-phase signals generated from three-phase AC signal generating source 47. This frequency, on the other hand, can be raised to a value near the switching operating frequencies (about 10 to 100 kHz) of the foregoing LTQ SI thyristors. Even in such a frequency band as well, the high-efficiency power conversion can be performed.

The single-phase DC-AC converting inverter shown in FIG. 4 is also similar to the above three-phase DC-AC inverter. Namely, light triggering pulse LT and light quenching pulse LQ are generated at the timing corresponding to the pulse width modulation signal, thereby allowing the LTQ SI thyristor to execute the switching operation. In this manner, the optical pulse width modulation (OPWM) control is executed. Therefore, the power conversion can be completely performed due to only two light beams and the power conversion can be safely and effectively carried out without considering the electrical insulation between the portion which handles a large electric power and the portion which handles the switching control as in the conventional apparatus. These effects can be also apparently applied to each of the embodiments which will be explained hereinafter.

Figure 10:
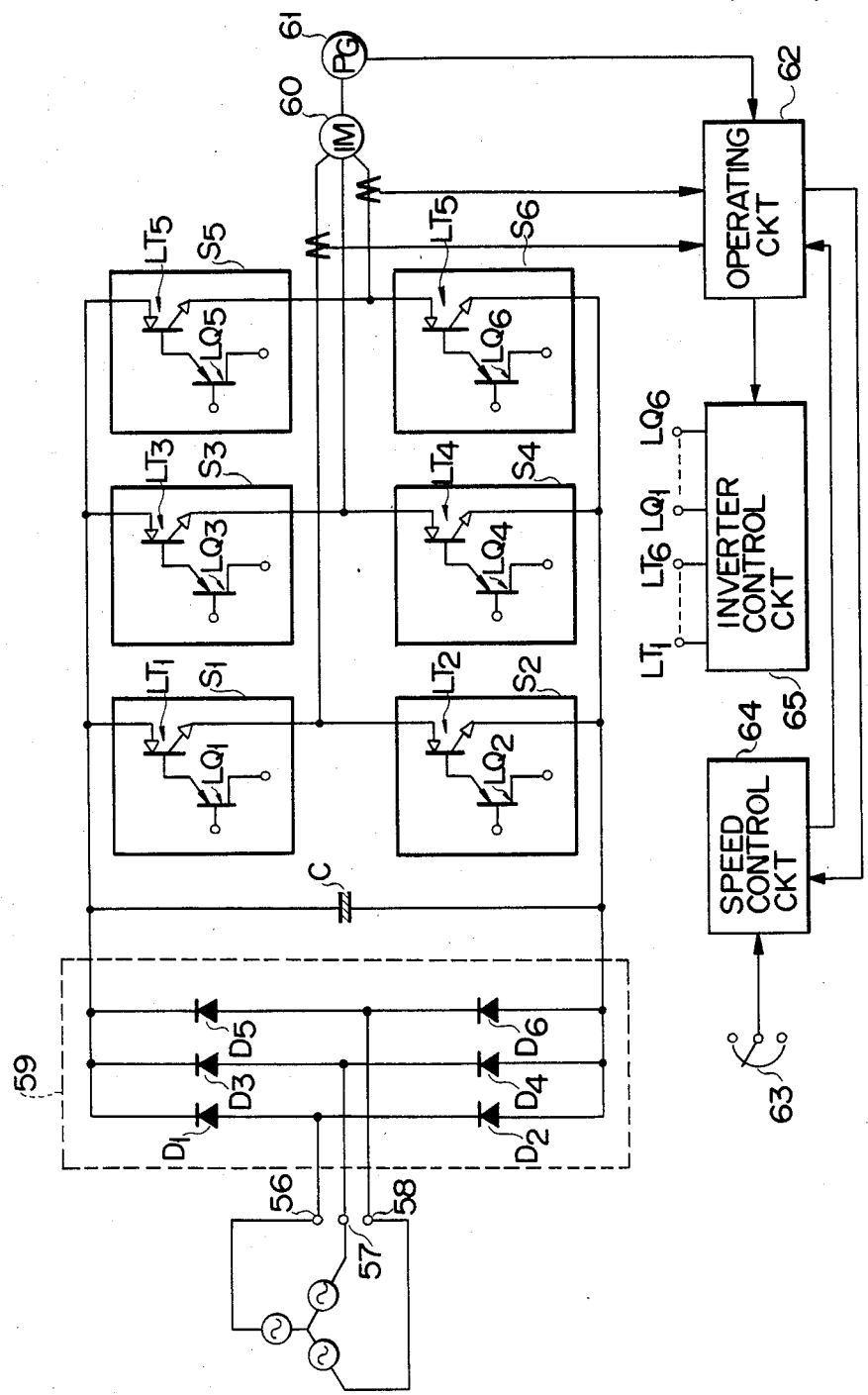
FIG. 10 is a block circuit diagram of an inverter for AC-DC-AC conversion to drive the three-phase AC motor used as the optically controlled power converting apparatus for a light triggered and light quenched electrostatic induction thyristor.

FIG. 10 shows an inverter for AC-DC-AC conversion including LTQ SI thyristors to drive a three-phase AC motor. Namely, in the diagram, outputs of a three-phase AC power source are supplied to input terminals 56 to 58. The three-phase alternating currents supplied to input terminals 56 to 58 are converted to DC voltages by a rectifier 59 consisting of rectifying elements $D_1$ to $D_6$. These DC voltages are converted to the R-phase, S-phase, and T-phase AC electric powers of variable frequencies by a three-phase DC-AC converting inverter (the same as that shown in FIG. 7) consisting of LTQ SI thyristors $S_1$ to $S_6$ and used to drive a three-phase AC motor 60.

The position and rotating speed of a rotor (not shown) of motor 60 are detected by a pulse generator 61. A detection signal which is output from pulse generator 61 is supplied to a vector arithmetic operating circuit 62. Operating circuit 62 vector-operates a desired torque of motor 60 on the basis of a speed control signal from a speed control circuit 64 which is controlled by an operating section 63 for adjustment and the foregoing detection signal. Operating circuit 62 then outputs a vector signal to an inverter control circuit 65.

Inverter control circuit 65 generates a predetermined pulse width modulation signal on the basis of the vector signal supplied and outputs light triggering pulses $LT_1$ to $LT_6$ and light quenching pulses $LQ_1$ to $LQ_6$ supplied to LTQ SI thyristors $S_1$ to $S_6$ at the timings corresponding to the pulse width modulation signal, respectively. Therefore, the three-phase inverter for the DC-AC conversion consisting of thyristors $S_1$ to $S_6$ is controlled and the torque and rotating speed of motor 60 are controlled.

By operating operating section 63, the generation timings of light triggering pulses $LT_1$ to $LT_6$ and light quenching pulses $LQ_1$ to $LQ_6$ which are output from inverter control circuit 65 are changed, thereby making it possible to vary the torque and rotating speed of motor 60.

In this case, the frequencies of the three-phase signals which are supplied to motor 60 can be continuously produced within a range of a few Hz to 100 kHz due to the switching operating frequencies of LTQ SI thyristors $S_1$ to $S_6$. Power conversion efficiency $\eta$ at this time is also held to a value of above 99%. Therefore, by combining with a high speed dedicated motor, this inverter can be also applied to a high-speed (tens of thousands of rpm) and high-capacity apparatus.

Figure 11:
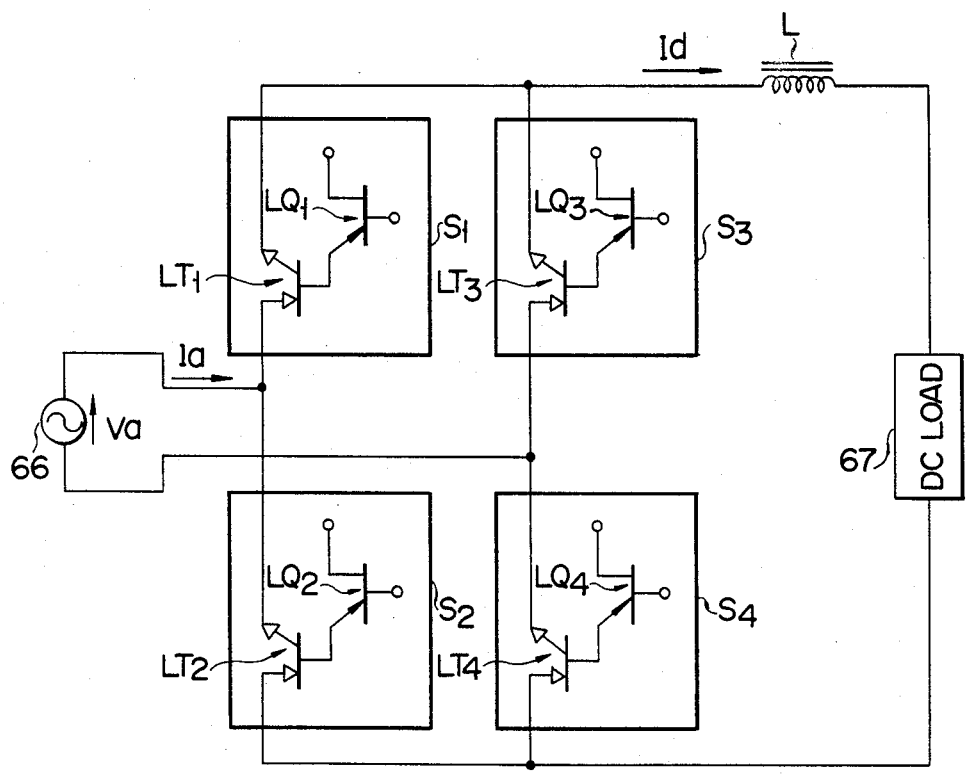
FIG. 11 is a circuit diagram of a single-phase converter for AC-DC conversion used as the optically controlled power converting apparatus for a light triggered and light quenched electrostatic induction thyristor.

FIG. 11 shows a single-phase converter including LTQ SI thyristors for AC-DC conversion. In the diagram, LTQ SI thyristors $S_1$ to $S_4$ perform the switching operations in response to light triggering pulses $LT_1$ to $LT_4$ and light quenching pulses $LQ_1$ to $LQ_4$, respectively. A single-phase AC voltage $v_a$ applied from a single-phase AC power supply system (not shown) is indicated as an AC power source 66. In the diagram, L denotes a smoothing reactor and 67 is a DC load circuit.

Figure 12:
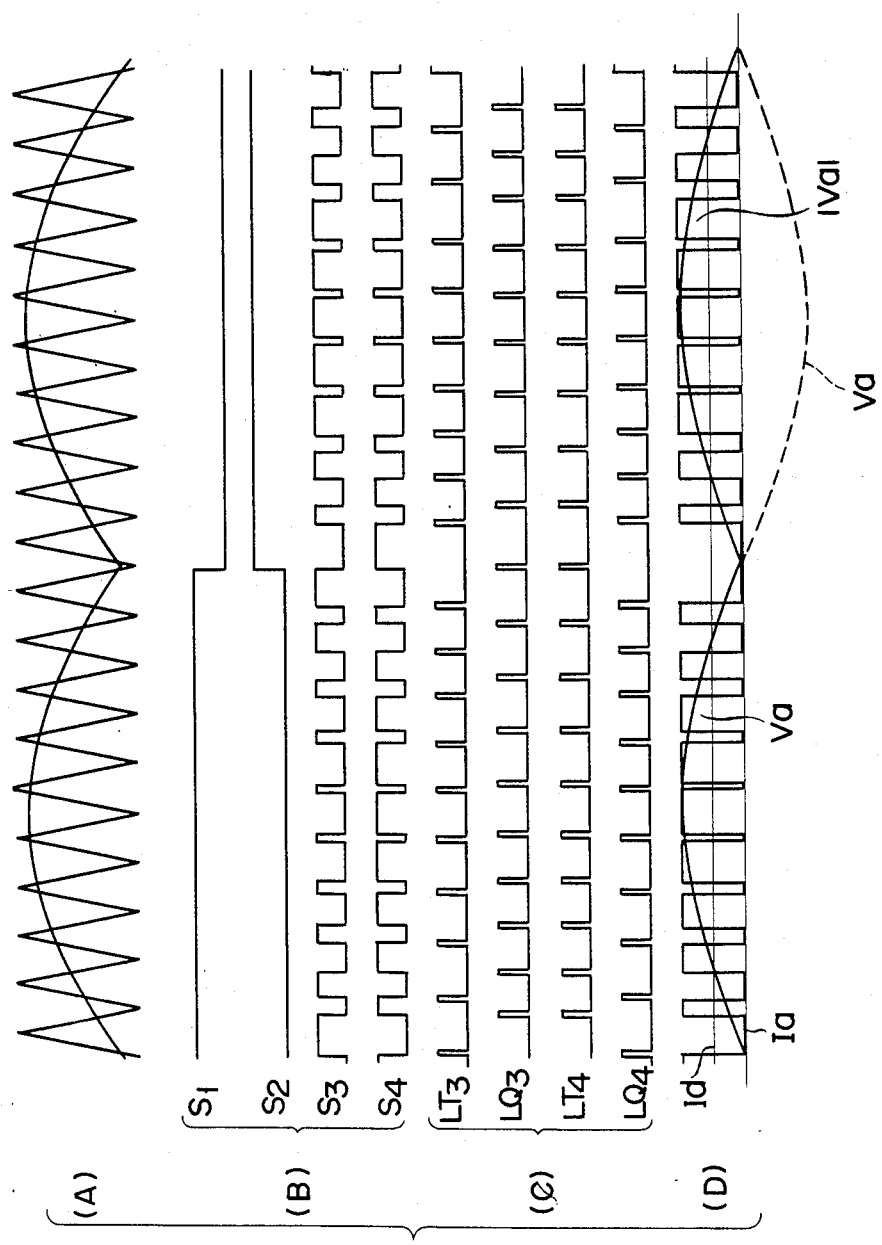
FIGS. 12A to 12D are timing charts for explaining the operation of the converter, respectively.

By use of a pulse width modulating section as shown in FIG. 5, an absolute value signal of a sine wave and a carrier triangular wave signal which are synchronized with output $v_a$ of AC power source 66 as shown in FIG. 12A are level compared, thereby allowing LTQ SI thyristors $S_1$ to $S_4$ to be switching-controlled on the basis of the resultant pulse width modulation signal, respectively.

Namely, FIG. 12B shows the timings for allowing thyristors $S_1$ to $S_4$ to execute the switching operations, respectively. In the diagram, a low level (L) denotes the turn-off state and a high level (H) indicates the turn-on state. In this case, the absolute value signal of the sine wave and the carrier triangular wave signal which are shown in FIG. 12A are supplied to the noninverting input terminal (+) and inverting input terminal (−) of level comparator 39 shown in FIG. 5, respectively. The resultant pulse width modulation signal corresponds to the timing waveform shown at $S_4$ in FIG. 12B to allow thyristor $S_4$ to perform the switching operation. Thyristor $S_3$ is switching-controlled in a manner opposite to thyristor $S_4$. On the other hand, thyristors $S_1$ and $S_2$ are oppositely switching-controlled at every half period of the sine wave signal.

FIG. 12C shows the timings of supplying light triggering pulses $LT_3$ and $LT_4$ and light quenching pulses $LQ_3$ and $LQ_4$ to thyristors $S_3$ and $S_4$ so that thyristors $S_3$ and $S_4$ execute the switching operations at the timings shown in FIG. 12B. Namely, light triggering pulse $LT_3$ and light quenching pulse $LQ_3$ to be supplied to thyristor $S_3$ are generated at the leading and trailing edges of the timing waveform shown at $S_3$ in FIG. 12B, respectively. Light triggering pulse $LT_4$ and light quenching pulse $LQ_4$ to be supplied to thyristor $S_4$ are generated at the leading and trailing edges of the timing waveform shown at $S_4$ in FIG. 12B, respectively. Thus, LTQ SI thyristors $S_3$ and $S_4$ can be switching-controlled at the timings shown at $S_3$ and $S_4$ in FIG. 12B.

Although not shown in FIGS. 12A to 12D, light triggering pulses $LT_1$ and $LT_2$ and light quenching pulses $LQ_1$ and $LQ_2$ which will be supplied to thyristors $S_1$ and $S_2$ are generated at the leading and trailing edges of the timing waveforms shown at $S_1$ and $S_2$ in FIG. 12B. Thus, thyristors $S_1$ and $S_2$ can be switching-controlled at the timings $S_1$ and $S_2$ in FIG. 12B.

By supplying light triggering pulses $LT_1$ to $LT_4$ and light quenching pulses $LQ_1$ to $LQ_4$ to thyristors $S_1$ to $S_4$ at the timings mentioned above, a current $I_a$ having no phase difference with $v_a$ as shown in FIG. 12D flows. Thus, a direct current $I_d$ as the mean value of $I_a$ is output to DC load circuit 67. In this way, the single-phase AC-DC conversion is performed.

Figure 13:
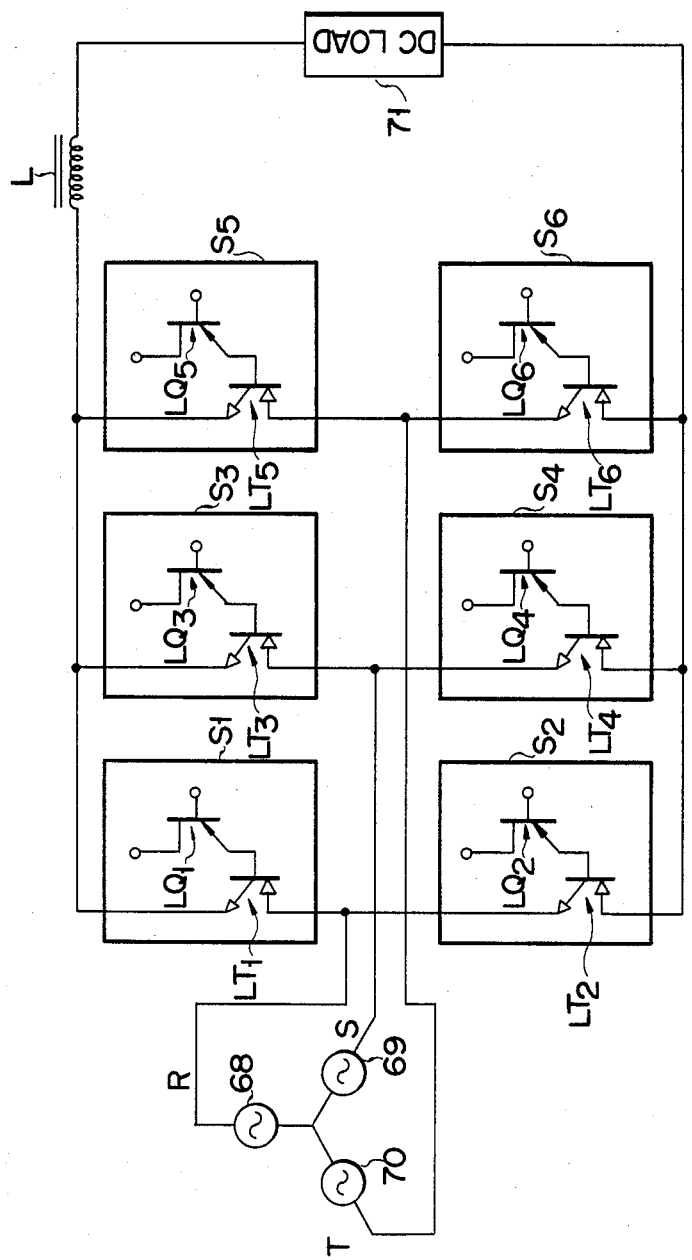
FIG. 13 is a circuit diagram of a three-phase converter for AC-DC conversion used as the optically controlled power converting apparatus for a light triggered and light quenched electrostatic induction thyristor.

FIG. 13 shows a three-phase converter including LTQ SI thyristors for AC-DC conversion. In the diagram, LTQ SI thyristors $S_1$ to $S_6$ execute the switching operations in response to light triggering pulses $LT_1$ to $LT_6$ and light quenching pulses $LQ_1$ to $LQ_6$, respectively. Reference numerals 68 to 70 denote three-phase AC power sources, L is the smoothing reactor, and 71 is a DC load circuit.

Figure 14:
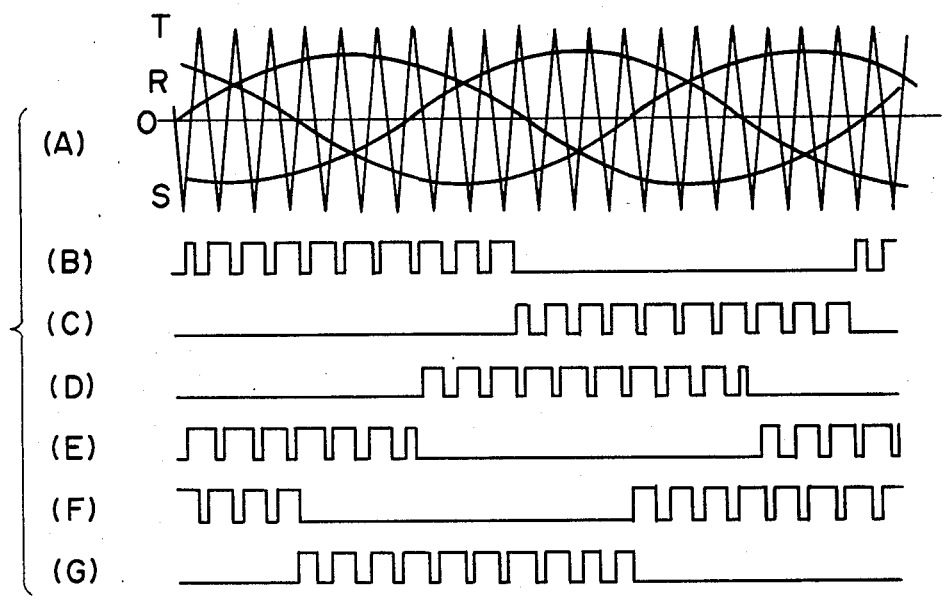
FIGS. 14A to 14G are timing charts for explaining the operation of the converter, respectively.

By use of a pulse width modulating section as shown in FIG. 8, R-phase, S-phase, and T-phase signals and carrier triangular wave signal which are synchronized with the three-phase AC power source as shown in FIG. 14A are level compared. Thyristors $S_1$ to $S_6$ are respectively switching-controlled on the basis of the resultant pulse width modulation signals. Namely, thyristor $S_1$ is switching-controlled on the basis of the pulse width modulation signal which is derived by level comparing the positive side of the R-phase signal with the carrier triangular wave signal. Thyristor $S_2$ is switching-controlled on the basis of the pulse width modulation signal which is obtained by level comparing the negative side of the R-phase signal with the carrier triangular wave signal. Thyristor $S_3$ is switching-controlled on the basis of the pulse width modulation signal which is derived by level comparing the positive side of the S-phase signal with the carrier triangular wave signal. Thyristor $S_4$ is switching-controlled on the basis of the pulse width modulation signal which is obtained by level comparing the negative side of the S-phase signal with the carrier triangular wave signal. Further, thyristor $S_5$ is switching controlled on the basis of the pulse width modulation signal which is derived by level comparing the positive side of the T-phase signal with the carrier triangular wave signal. Thyristor $S_6$ is switching controlled on the basis of the pulse width modulation signal which is obtained by level comparing the negative side of the T-phase signal with the carrier triangular wave signal.

Namely, thyristors $S_1$ to $S_6$ execute the switching operations at the timings shown in FIGS. 14B to 14G, respectively. In this case, the L level periods of the timing waveforms shown in FIGS. 14B to 14G indicate the turn-off state of thyristors $S_1$ to $S_6$. The high level (H) periods represent the turn-on state. By supplying light trigger pulses $LT_1$ to $LT_6$ and light quench pulses $LQ_1$ to $LQ_6$ to LTQ SI thyristors $S_1$ to $S_6$ at the timings mentioned above, the R-phase, S-phase, and T-phase signals are converted to the direct currents and synthesized and supplied to smoothing reactor L and DC load circuit 71. In this manner, the three-phase AC-DC conversion is executed.

Power factors of the single-phase and three-phase converters for the AC-DC conversion as mentioned above are 1.0 irrespective of a variation in DC load, and no lower orders of harmonics are generated on the AC side. On the other hand, in any of the inverter for the DC-AC conversion and the converter for the AC-DC conversion as well, a multiphase AC signal of, e.g., six phases, twelve phases, or the like can be handled without limiting to three phases.

Figure 15:
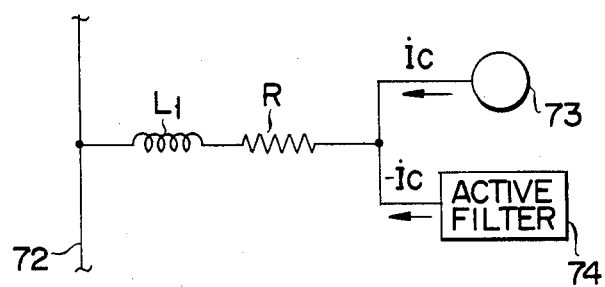
FIG. 15 is a circuit arrangement diagram showing the concept of an active filter.

An example in the case where the present invention is applied to an active filter will now be described. FIG. 15 shows an active filter of the harmonics cancelling type. The concept will be first simply explained. In the diagram, reference numeral 72 denotes an infinite bus bar; a reactance $L_1$ and a resistor R are line impedances; 73 a harmonics current source; and 74 an active filter. The active filter 74 outputs a harmonics current $-\dot{I}_c$ having the same magnitude as that of harmonics current $\dot{I}_c$ which is supplied from the harmonics current source 73 to the infinite bus bar 72 and having the inverted polarity. Both harmonics currents $\dot{I}_c$ and $-\dot{I}_c$ are synthesized, thereby preventing harmonics current $\dot{I}_c$ from flowing into bus bar 72.

Figure 16:
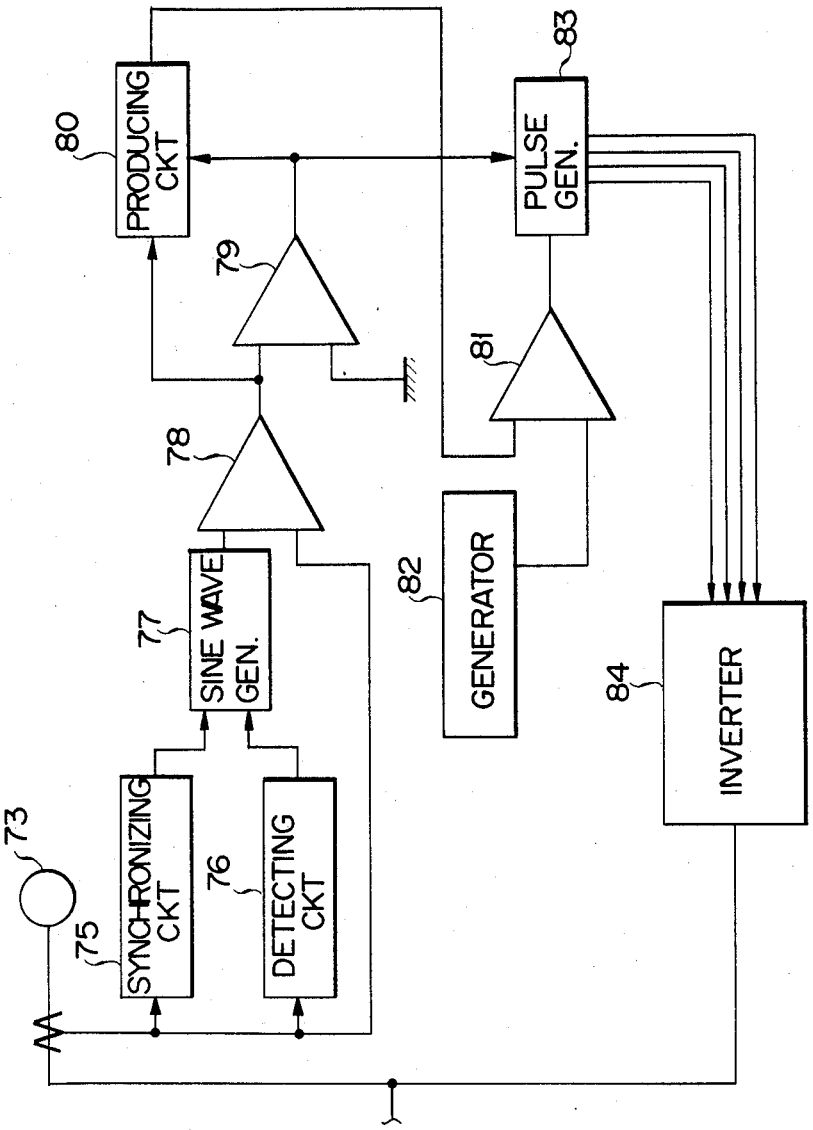
FIG. 16 is a detailed block diagram of the active filter used in the inverter circuit of the light triggered and light quenched electrostatic induction thyristor.
Figure 17:
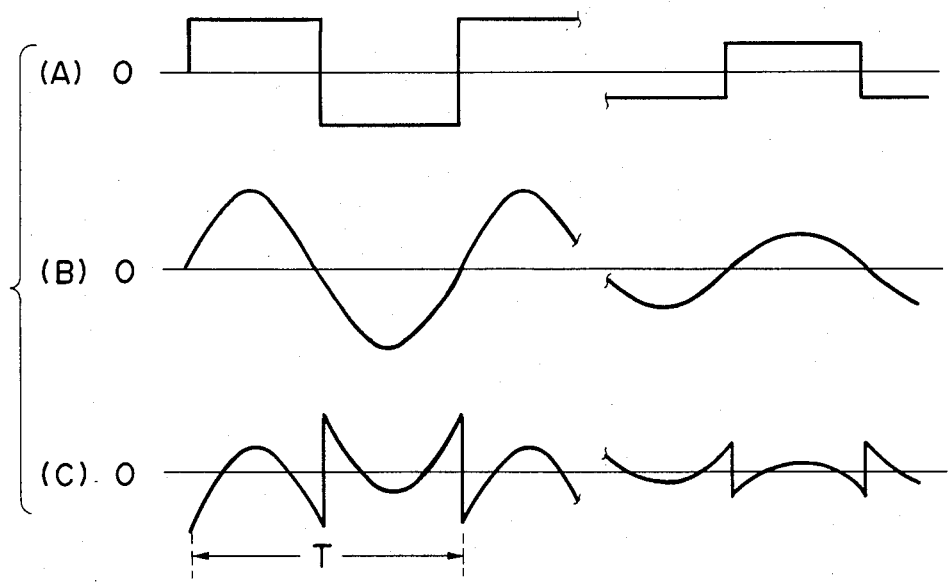
FIGS. 17A to 17C, 18A to 18C, 19A, 19B, and 20A to 20F are timing charts of various signals, explaining the operation of the active filter, respectively.
Figure 18:
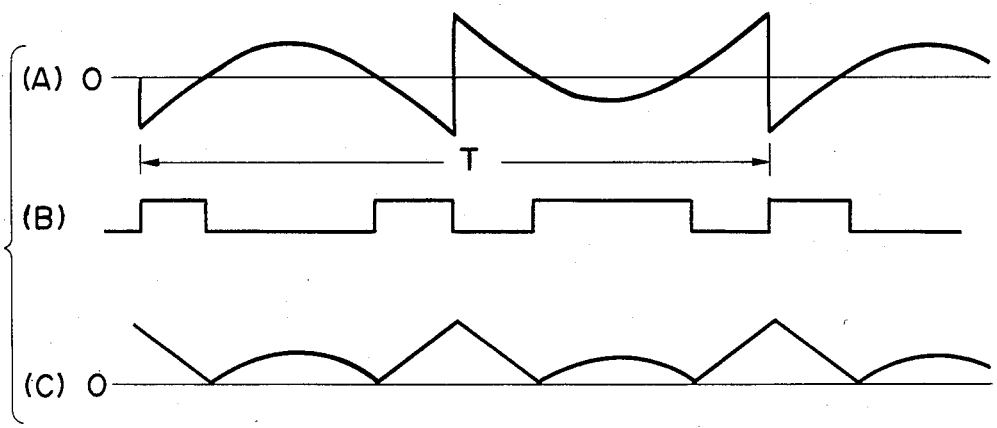
Figure 19:
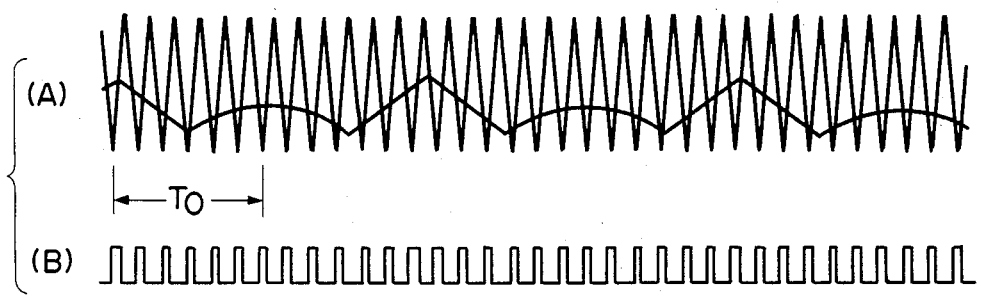
Figure 20:
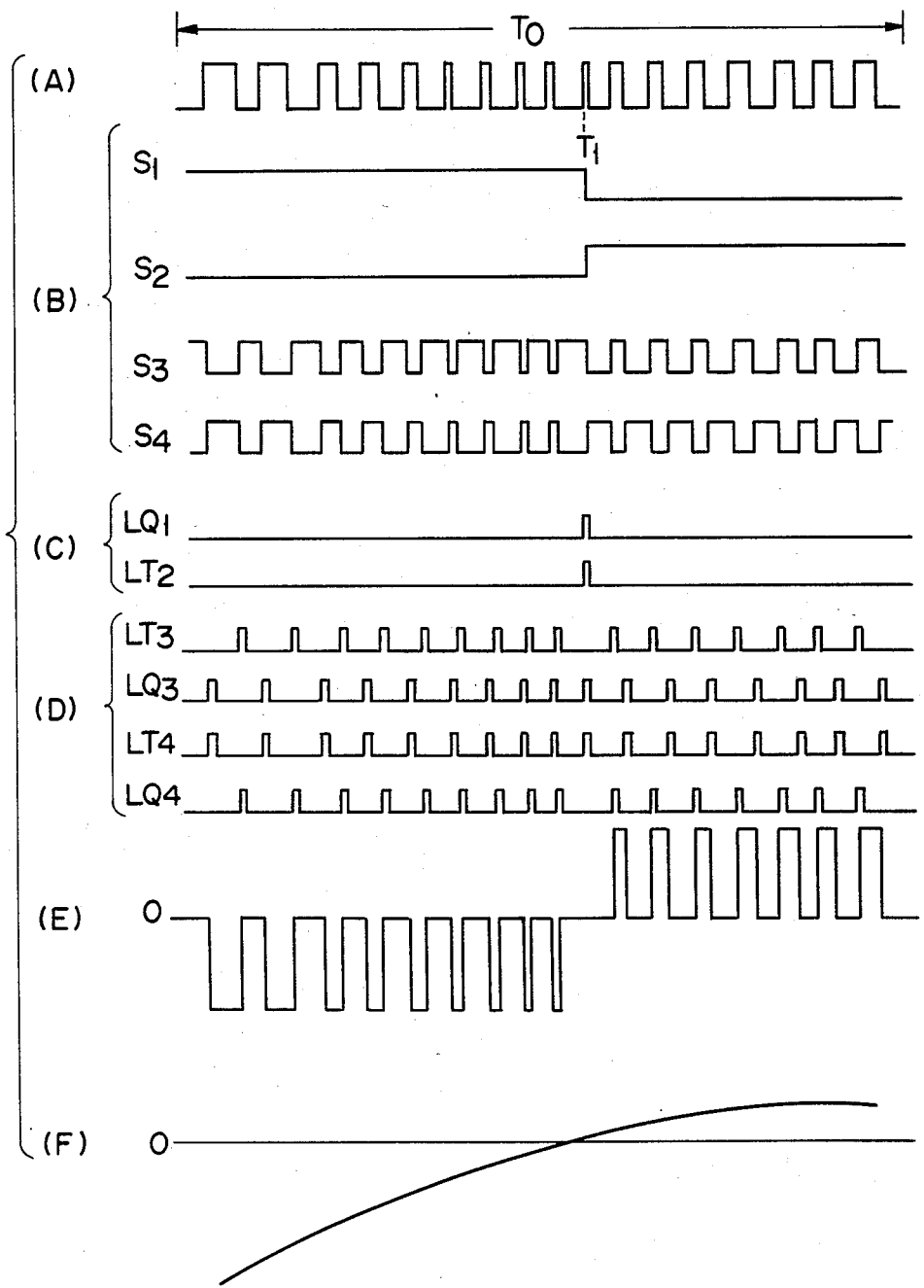

FIG. 16 shows a practical arrangement of active filter 74. An explanation will now be made hereinbelow with reference to timing charts shown in FIGS. 17 to 20. Namely, a distortion current as shown in FIG. 17A which is output from harmonics current source 73 (in FIGS. 17A to 17C, the waveforms on the right side show the case of a small level) is supplied to a synchronizing circuit 75 and an RMS value detecting circuit 76. The synchronizing circuit 75 produces a synchronized detection signal which is synchronized with the distortion current. The detecting circuit 76 detects the RMS value of the distortion current and produces an RMS value detection signal.

The synchronized detection signal and RMS value detection signals are supplied to a sine wave generator 77. On the basis of these detection signals received, sine wave generator 77 produces a sine wave signal as shown in FIG. 17B which is proportional to the RMS value of the distortion current and synchronized with the distortion current. The sine wave signal generated from generator 77 and the distortion current are supplied to a comparator 78 and the subtraction of (sine wave signal)−(distortion current)

is executed. Thus, a subtracted signal as shown in FIG. 17C is the output from comparator 78.

FIG. 18A shows an enlarged waveform for a period T of the subtracted signal shown in FIG. 17C. The subtracted signal is supplied to a comparator 79 and an absolute value producing circuit 80, respectively. Comparator 79 compares the subtracted signal with an earth potential and outputs a zero-cross signal as shown in FIG. 18B in which the polarity is inverted at the zero-cross points of the subtracted signal. The absolute value producing circuit 80 calculates the absolute value of the subtracted signal on the basis of the zero-cross signal and outputs an absolute value signal as shown in FIG. 18C.

The absolute value signal is supplied to one of the input terminals of a comparator 81. A carrier triangular wave signal as shown in FIG. 19A which is output from a carrier triangular wave signal generator 82 is supplied to the other input terminal of comparator 81. The comparator 81 executes the subtraction of (absolute value signal)−(carrier triangular wave signal) and outputs a pulse width modulation signal as shown in FIG. 19B.

The pulse width modulation signal and zero-cross signal are supplied to a pulse generator 83 and used to produce light triggering pulses $LT_1$ to $LT_4$ and light quenching pulses $LQ_1$ to $LQ_4$. Light triggering pulses $LT_1$ to $LT_4$ and light quenching pulses $LQ_1$ to $LQ_4$ are supplied to an inverter for DC-AC conversion (hereinafter, referred to as an inverter circuit) 84. The inverter circuit 84 has the same constitution as that of the inverter for the DC-AC conversion using LTQ SI thyristors $S_1$ to $S_4$ shown in FIG. 4.

Namely, FIG. 20A shows an enlarged waveform of a part $T_0$ of the pulse width modulation signal shown in FIG. 19B. In FIG. 20A, the polarity of the zero-cross signal is inverted at time $T_1$ and it is assumed that the subtracted signal shown in FIG. 18A is at a positive level for the period before time $T_1$ and at a negative level for the period after time $T_1$. In this case, pulse generator 83 generates light triggering pulses $LT_1$ to $LT_4$ and light quenching pulses $LQ_1$ to $LQ_4$ such that LTQ SI thyristors $S_1$ to $S_4$ of the inverter circuit 84 execute the switching operations at the timings shown in FIG. 20B. In this case, the low level periods of the timing waveforms shown in FIG. 20B indicate the turn-off states of respective thyristors $S_1$ to $S_4$ and the high level periods represent the turn-on states.

FIG. 20C shows the irradiation timings for light quenching pulse $LQ_1$ and light triggering pulse $LT_2$ which are irradiated to thyristors $S_1$ and $S_2$ so as to allow thyristors $S_1$ and $S_2$ to execute the switching operations at the timings shown at $S_1$ and $S_2$ in FIG. 20B. FIG. 20D shows the timings of supplying light triggering pulses $LT_3$ and $LT_4$ and light quenching pulses $LQ_3$ and $LQ_4$ to thyristors $S_3$ and $S_4$ so that thyristors $S_3$ and $S_4$ perform the switching operations at the timings shown at $S_3$ and $S_4$ in FIG. 20B. The relations among these timings can be described in a manner similar to the case shown in FIG. 6; therefore, their descriptions are omitted.

By supplying light triggering pulses $LT_1$ to $LT_4$ and light quenching pulses $LQ_1$ to $LQ_4$ to LTQ SI thyristors $S_1$ to $S_4$ at the timings as mentioned above, a pulse signal having a duty ratio corresponding to the subtracted signal shown in FIG. 17C is the output from the inverter circuit 84 as shown in FIG. 20E. The mean value of this pulse signal becomes as shown in FIG. 20F and the subtracted signal shown in FIG. 17C can be obtained.

Namely, the signal having substantially the same magnitude as that of the output of harmonics current source 73 and having the inverted polarity can be derived from the inverter circuit 84 using the LTQ SI thyristors. Thus, the harmonic current can be set off.

Figure 21:
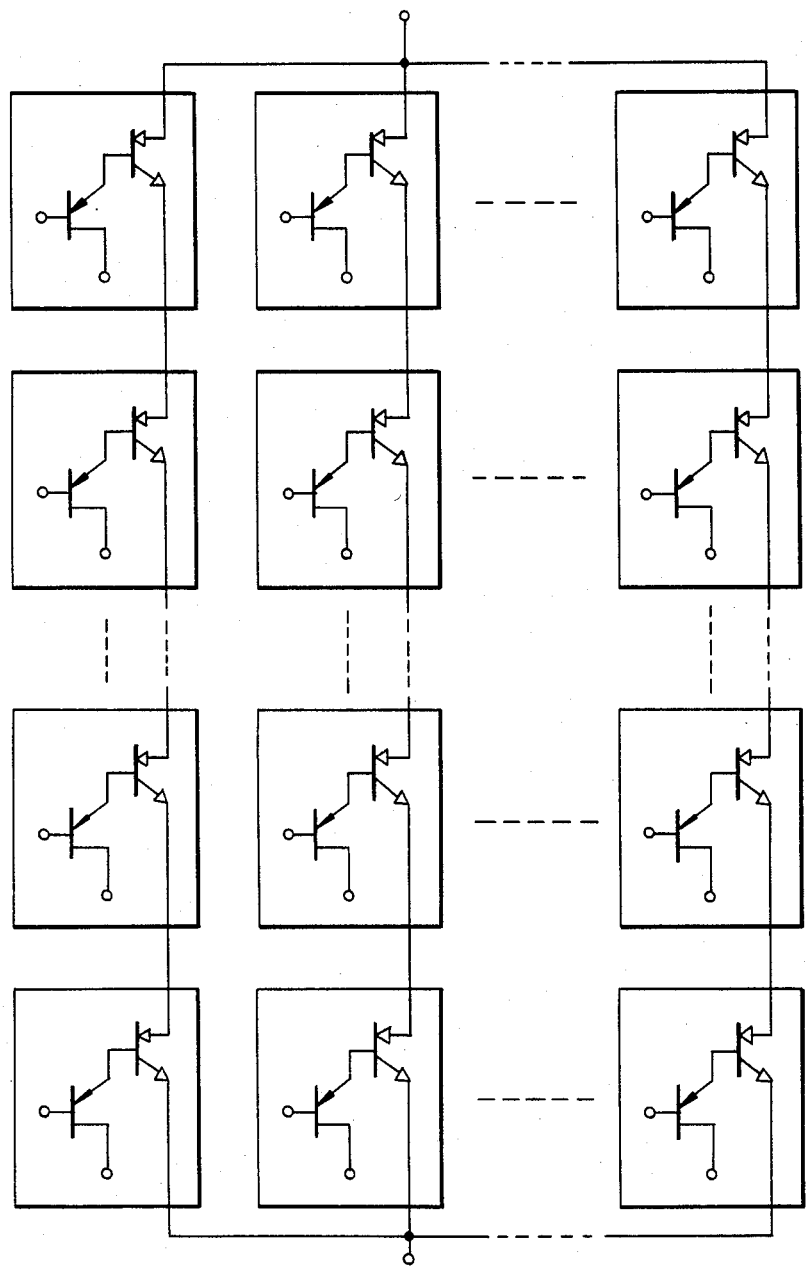
FIG. 21 is a circuit arrangement diagram showing a series-parallel connection of light triggered and light quenched electrostatic induction thyristors.

In the case of handling a large electric power in each of the above-mentioned embodiments, as shown in FIG. 21, a plurality of LTQ SI thyristors are connected in series-parallel and the respective thyristors may be allowed to simultaneously execute the switching operations by the light triggering pulses and light quenching pulses.

Therefore, as described in detail above, according to the invention, the optical pulse width modulation (OPWM) control is executed by the simple constitution at a high operating speed in a manner such that light triggering pulse LT and light quenching pulse LQ are generated at the timings corresponding to the pulse width modulation signal, thereby allowing the LTQ SI thyristor to execute the switching operation. Therefore, the power conversion can be completely performed due to only the light and the power conversion can be safely and effectively executed without considering the electrical insulation between the portion which handles a large electric power and the portion which performs the switching control as in the conventional apparatus.

What is claimed is:

1. In a power converting apparatus in which power from a source is applied to input terminals of a bridge circuit including switching elements selectively controlled by a control device to switch on and off thereby to produce converted output power at output terminals connected to a load, the improvement comprising:

said bridge circuit being optically controlled and including light triggered and light quenched electrostatic induction (LTQ SI) thyristors as said switching elements; and said control device including means for producing light quenching pulses supplied to said thyristors at timings corresponding to a pulse width modulation, thereby allowing predetermined electric power converting operations to be performed.

2. The power converting apparatus according to claim 1, wherein said LTQ SI thyristors of said bridge circuit and said control device operate as an inverter to perform DC-AC power inversion from a DC source to a single-phase AC output applied to the load.

3. The power converting apparatus according to claim 1, wherein said LTQ SI thyristors of said bridge circuit and said control device operate as an inverter to perform DC-AC power inversion from a DC source to a polyphase AC output applied to the load.

4. The power converting apparatus according to claim 1, wherein said LTQ SI thyristors of said bridge circuit and said control device operate as an inverter to perform AC-to-DC-to-AC conversion to convert an AC input from a polyphase AC source to a DC form and convert the DC form to a polyphase AC output applied to the load.

5. The power converting apparatus according to claim 1, wherein said LTQ SI thyristors of said bridge circuit and said control device operate to perform AC-DC power conversion to convert a single-phase AC input from said source to a DC output applied to said load.

6. The power converting apparatus according to claim 1, wherein said LTQ SI thyristors of said bridge circuit and said control device operate as an inverter to perform AC-DC conversion to convert a polyphase AC input from said source to a DC output applied to said load.

7. An optically controlled power converting apparatus comprising:

first to fourth light triggered and light quenched electrostatic induction (LTQ SI) thyristors adapted to be turned ON upon receipt of a light trigger-pulse and be turned OFF upon receipt of a light quench-pulse;

a first output terminal connected to a common junction between the cathode electrode of said first LTQ SI thyristor and the anode electrode of said second LTQ SI thyristor;

a second output terminal connected to a common junction between the cathode electrode of said third LTQ SI thyristor and the anode electrode of said fourth LTQ SI thyristor;

current/voltage supply means for applying a predetermined DC voltage between a common junction of the anode electrodes of said first and third LTQ SI thyristors on one hand and a common junction of the cathode electrodes of said second and fourth LTQ SI thyristors on the other hand; and means for converting to a pulse width modulation signal an AC signal having the same frequency as that of a signal to be obtained across said one output terminal and said other output terminal, wherein the light trigger- and light quench-pulses are alternately applied, for each half cycle of said AC signal, to the first LTQ SI thyristor to perform switching control and said light trigger- and light quench-pulses are alternately applied, in a reverse relation to that in the case of the first LTQ SI thyristor, to the second LTQ SI thyristor to perform switching control, and the light trigger- and light quench-pulses are alternately applied to the third LTQ SI thyristor at a timing synchronized with the pulse width modulation signal to perform switching control, and the light trigger- and light quench-pulses are alternately applied to the fourth LTQ SI thyristor in a reverse relation to that in the case of said third LTQ SI thyristor, whereby a single-phase AC output signal is obtained across said first output and second output terminals.

8. An optically controlled power converting apparatus comprising:

first to fourth light triggered and light quenched electrostatic induction (LTQ SI) thyristors adapted to be turned ON upon receipt of a light trigger-pulse and be turned OFF upon receipt of a light quench-pulse;

a first output terminal connected to a common junction of the cathode electrode of said first LTQ SI thyristor and the anode electrode of said second LTQ SI thyristor;

a second output terminal connected to a common junction of the catode electrode of said third LTQ SI thyristor and the anode electrode of said fourth LTQ SI thyristor;

DC voltage supply means for applying a constant DC voltage between a common junction of the anode electrodes of said first and third LTQ SI thyristors and a common junction of the cathode electrode of said second and fourth LTQ SI thyristors; and means for converting first and second AC signals to first and second pulse width modulation signals, said first and second AC signals having the same frequency and phase difference as those of signals to be obtained from said first and second output terminals;

wherein the light trigger- and light quench-pulses are alternately applied to the first LTQ SI thyristor at a timing synchronized with the first pulse width modulation signal to perform switching control and the light trigger- and light quench-pulses are alternately applied to the second LTQ SI thyristor in a reverse relation to that in the case of the first LTQ SI thyristor to perform a switching control and the light trigger- and light quench-pulses are alternately applied to the third LTQ SI thyristor at a timing synchronized with the second pulse width modulation signal to perform switching control and the light trigger and light quench-pulses are alternately applied to the fourth LTQ SI thyristor in a reverse relation to the third LTQ SI thyristor, whereby first and second AC output signals are obtained which are of the same frequency but different in phase.

9. An optically controlled power converting apparatus comprising:
   an AC power generator for generating first and second AC power signals which are the same frequency as, but different in phase from, each other;
   a rectifier for converting first and second AC power signals wich are output from said AC power generator to DC current;
   a DC-to-AC converter comprised of first to fourth light triggered and light quenched electrostatic induction (LTQ SI) thyristors adapted to be turned ON upon receipt of a light trigger-pulse and be turned OFF upon receipt of a light quench-pulse, wherein a common junction is formed between the cathode electrode of said first LTQ SI thyristor and the anode electrode of said second LTQ SI thyristor and a common junction is formed between the cathode electrode of said third LTQ SI thyristor and the anode electrode of said fourth LTQ SI thyristor, said DC-to-AC converter being driven upon receipt of a first AC output signal delivered from the common junction between the cathode electrode of said first LTQ SI thyristor and anode electrode of said second LTQ SI thyristor and upon receipt of a second AC output signal delivered from the common junction between the cathode electrode of said third LTQ SI thyristor and the anode of the fourth LTQ SI thyristor, said second AC output signal being the same frequency as, but different in phase from, said first AC output signal;
   means for converting to first and second pulse width modulation signals said first and second AC signals having the same frequency and phase difference as those of said first and second AC output signals to be received by said DC-to-AC converter;
   wherein the light trigger- and light quench-pulses are alternately applied to the first LTQ SI thyristor at a timing synchronized with the first pulse width modulation signal to perform switching control and the light trigger- and light quench-pulses are alternately applied to the second LTQ SI thyristor in a reverse relation to that in the case of said first LTQ SI thyristor to perform switching control and the light trigger- and light quench-pulses are alternately applied to the third LTQ SI thyristor at a timing synchronized with said pulse width modulation signal to perform switching control and the light trigger- and light quench-pulses are alternately applied to the fourth LTQ SI thyristor in a reverse relation to that in the case of said third LTQ SI thyristor to perform switching control, whereby first and second AC output signals are obtained from said DC-AC converter.

10. An optically controlled power converting apparatus comprising:
   a AC-to-DC converter including first to fourth light triggered and light quenched electrostatic induction (LTQ SI) thyristors adapted to be turned ON upon receipt of a light trigger-pulse and be turned OFF upon receipt of a light quench-pulse, in which a common junction is formed between the anode electrode of the first LTQ SI thyristor and the cathode electrode of the second LTQ SI thyristor and a common junction is formed between the anode electrode of the third LTQ SI thyristor and the cathode electrode of the fourth LTQ SI thyristor and the cathode electrode of the first LTQ SI thyristor is connected to that of the third LTQ SI thyristor and anode electrode of the second LTQ SI thyristor is connected to that of the fourth LTQ SI thyristor;
   an AC power generator for supplying a single-phase AC power signal between the common junction of the anode electrode of the first LTQ SI thyristor and the cathode electrode of the second LTQ SI thyristor and the common junction of the anode electrode of the third LTQ SI thyristor and the cathode electrode of the fourth LTQ SI thyristor in the AC-to-DC converter;
   wherein a DC load circuit is adapted to be inserted between a common junction of the cathode electrodes of said first and third LTQ SI thyristors and a common junction of the anode electrodes of the second and fourth LTQ SI thyristors; and
   means for converting an AC signal which has the same frequency as that of the AC power signal supplied from said AC power generator to a pulse width modulation signal;
   wherein the light trigger- and light quench-pulses are alternately applied to the first LTQ SI thyristor for each half cycle of said AC signal to perform switching control and the light trigger- and light quench-pulses are alternately applied to the second LTQ SI thyristor in a reverse relation to that in the case of the first LTQ SI thyristor to perform switching control and the light trigger- and light quench-pulses are alternately applied to the third LTQ SI thyristor to perform switching control and the light trigger- and light quench-pulses are applied to the fourth LTQ SI thyristor in a reverse dlrection to that in the case of the third LTQ SI thyristor to perform switching control, whereby a DC current is supplied to said DC load circuit.

11. An optically controlled power converting apparatus comprising:
   a AC-to-DC converter including first to fourth light triggered and light quenched electrostatic induction (LTQ SI) thyristors adapted to be turned ON upon receipt of a light trigger-pulse and be turned OFF upon receipt of a light quench-pulse, wherein a common junction is formed between the anode electrode of said first LTQ SI thyristor and the cathode electrode of said second LTQ SI thyristor and a common junction is formed between the anode electrode of the third LTQ SI thyristor and the cathode electrode of the fourth LTQ SI thyristor and the cathode of the first LTQ SI thyristor is connected to that of the third LTQ SI thyristor and anode of the second LTQ SI thyristor is connected to that of the fourth LTQ SI thyristor;
   an AC power generator for supplying first and second AC power signals, respectively, to the common junction of the anode electrode of said first LTQ SI thyristor and the cathode electrode of said second LTQ SI thyristors and the common junction of the anode electrode of the third LTQ SI thyristor and the cathode electrode of the fourth LTQ SI thyristor in said AC-to-DC converter, said first and second AC power signals being the same as, but different in phase from, each other;

wherein a DC load circuit is adapted to be inserted between a common junction of the cathode electrodes of said first and third LTQ SI thyristors and a common junction of the anode electrodes of said second and fourth LTQ SI thyristors;

means for converting first and second AC signals of the same frequency and phase difference as those of said first and second AC power signals from the AC power generator to first and second pulse width modulation signals, respectively;

wherein the light trigger- and light quench-pulses are alternately applied to the first LTQ SI thyristor at a timing synchronized with said first pulse width modulation signal to perform switching control and the light trigger- and quench-pulses are alternately applied to the second LTQ SI thyristor in a reverse relation to that in the case of the first LTQ SI thyristor to perform switching control and the light trigger- and light quench-pulses are alternately applied to the third LTQ SI thyristor at a timing synchronized with said second pulse width modulation signal to perform switching control and the light trigger- and light quench-pulses are alternately applied to the fourth LTQ SI thyristor in a reverse relation to that in the case of the third LTQ SI thyristor to perform switching control, whereby a DC current is supplied to said DC load circuit.

12. An optically controlled power converting apparatus comprising:

a DC-AC inverter including a bridge circuit of a plurality of light triggered and light quenched electrostatic induction (LTQ SI) thyristors adapted to be turned ON upon receipt of a light trigger-pulse and be turned OFF upon receipt of a light quench-pulse and applying the light trigger- and light quench-pulses to the respective LTQ SI thyristors at a timing corresponding to a pulse width modulation to perform switching control so that a power inversion of the DC current to a single-phase AC current is achieved; and means for generating a pulse width modulation signal for controlling the time at which the light trigger- and light quench-pulses are applied to the respective LTQ SI thyristors in order for said DC-to-AC inverter to output a compensation current signal having the same magnitude as, but a polarity inverted with respect to, a deformation current in accordance with the deformation current signal supplied to a bus line, whereby the deformation current is cancelled through the supply of said compensation current to the bus line.

13. The optically controlled power converting apparatus according to claim 12, comprising:

said DC-to-AC inverter including a bridge circuit having first to fourth LTQ SI thyristors, wherein a common junction is formed between the cathode electrode of the first LTQ SI thyristor and the anode electrode of the second LTQ SI thyristor and a common junction is formed between the cathode electrode of the third LTQ SI thyristor and the anode electrode of the fourth LTQ SI thyristor and the anode electrode of the first LTQ SI thyristor is connected to that of the third LTQ SI thyristor and the cathode electrode of the second LTQ SI thyristor is connected to that of said fourth LTQ SI thyristor;

DC voltage supply means for supplying a constant DC voltage between a common junction of the anode electrodes of the first and third LTQ SI thyristors and a common junction of the cathode electrodes of the second and fourth LTQ SI thyristors;

means for applying light trigger- and light quench-pulses to the first to fourth LTQ SI thyristors at a timing synchronized with the pulse width modulation signal, whereby a compensation current having the same magnitude as, but a polarity inverted with respect to, the deformation current is produced between a common junction of the cathode electrode of the first LTQ SI thyristor and the anode electrode of the second LTQ SI thyristor and a common junction of the cathode electrode of the third LTQ SI thyristor and the anode electrode of the fourth LTQ SI thyristor.

14. The optically controlled power converting apparatus according to claim 13, wherein said means for generating said pulse width modulation signal comprises:

a synchronizing circuit for receiving the deformation current and for producing a detection signal in synchronism with the deformation current;

an effective value detector responsive to the deformation current to detect the effective value of the deformation current;

a sine wave generator for receiving the outputs of the synchronizing circuit and effective value detector and for generating a sine wave signal in synchronism with the deformation current and in proportion to the effective value of the deformation current;

a first subtractor for calculating a difference component between the sine wave generator from the sine wave generator and the deformation current and for producing a corresponding difference signal;

a comparator for comparing the difference signal of the first subtracter with a zero level to generate a zero crossing signal having a polarity inverted at the zero crossing point of a subtraction signal;

an absolute value circuit for delivering an absolute value signal, which is obtained by taking the absolute value of said subtraction signal, in accordance with the zero crossing signal from the comparator; and a second subtracter for calculating a difference component between the absolute value signal from the absolute value circuit and a carrier square wave signal of a fixed frequency, wherein said light trigger- and light quench-pulses are alternately applied to the first LTQ SI thyristor at a timing synchronized with the zero crossing signal to perform switching control and the light trigger- and light quench-pulses are alternately applied to the second LTQ SI thyristor in a reverse relation to that in the case of the first LTQ SI thyristor to perform switching control and the light trigger- and light quench-pulses are alternately applied to the third LTQ SI thyristor at a timing synchronized with said pulse width modulation signal to perform switching control and the light trigger- and light quench-pulses are alternately applied to the fourth LTQ SI thyristor in a reverse relation to that in the case of the third LTQ SI thyristor to perform switching control, whereby a compensation current is obtained which has the same magnitude as, but a polarity inverted with respect to, the deformation current.

* * * * *